US009001466B2

(12) United States Patent
Sato et al.

(10) Patent No.: US 9,001,466 B2
(45) Date of Patent: Apr. 7, 2015

(54) THREE-DIMENSIONAL MAGNETIC RECORDING AND REPRODUCING APPARATUS INCLUDING A PLURALITY OF MAGNETIC LAYERS HAVING DIFFERENT RESONANT FREQUENCIES

(75) Inventors: Rie Sato, Yokohama (JP); Koichi Mizushima, Kamakura (JP); Tazumi Nagasawa, Yokohama (JP); Kiwamu Kudo, Kamakura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/416,815

(22) Filed: Mar. 9, 2012

(65) Prior Publication Data

US 2012/0224283 A1    Sep. 6, 2012

Related U.S. Application Data

(63) Continuation of application No. PCT/JP2009/065947, filed on Sep. 11, 2009.

(51) Int. Cl.
*G11B 5/00* (2006.01)
*G11B 5/66* (2006.01)
*G11B 5/31* (2006.01)
*G11B 5/82* (2006.01)

(52) U.S. Cl.
CPC .............. *G11B 5/66* (2013.01); *G11B 5/3133* (2013.01); *G11B 5/82* (2013.01); *G11B 2005/001* (2013.01)

(58) Field of Classification Search
CPC ............................. G11B 5/743; G11B 5/3116
USPC ................... 360/135, 121, 119.01–119.13
See application file for complete search history.

(56) References Cited

U.S. PATENT DOCUMENTS

| | | | |
|---|---|---|---|
| 7,580,227 | B2 | 8/2009 | Sato et al. |
| 7,961,439 | B2 | 6/2011 | Sato et al. |

(Continued)

FOREIGN PATENT DOCUMENTS

| | | |
|---|---|---|
| JP | 7-326002 A | 12/1995 |
| JP | 2005-285242 | 10/2005 |

(Continued)

OTHER PUBLICATIONS

International Search Report issued Dec. 15, 2009 in PCT/JP2009/065947 filed Sep. 11, 2009 (with English translation).

(Continued)

*Primary Examiner* — Joseph Feild
*Assistant Examiner* — Gustavo Polo
(74) *Attorney, Agent, or Firm* — Oblon, McClelland, Maier & Neustadt, L.L.P.

(57) ABSTRACT

According to one embodiment, a three-dimensional magnetic recording and reproducing apparatus includes a magnetic head and a magnetic storage medium. The magnetic head includes a spin-torque oscillator including a free layer, a non-magnetic layer and a fixed layer, magnetization of the free layer being rotatable, the non-magnetic layer being laminated on the free layer, the fixed layer being laminated on the non-magnetic layer, a magnetization direction of the fixed layer being fixed. The magnetic storage medium includes first magnetic layers formed of magnetic materials having different resonant frequencies, each of the first magnetic layers being formed of an in-plane magnetization film and having recording tracks.

12 Claims, 22 Drawing Sheets

(56) References Cited

U.S. PATENT DOCUMENTS

| | | |
|---|---|---|
| 2006/0221507 A1 | 10/2006 | Sato et al. |
| 2008/0304176 A1 | 12/2008 | Takagishi et al. |
| 2009/0080109 A1 | 3/2009 | Fukuzawa et al. |

FOREIGN PATENT DOCUMENTS

| | | |
|---|---|---|
| JP | 2006-286093 A | 10/2006 |
| JP | 2008-305486 A | 12/2008 |
| JP | 2009-080904 A | 4/2009 |

OTHER PUBLICATIONS

Written Opinion Report issued Dec. 15, 2009 in PCT/JP2009/065947 filed Sep. 11, 2009.
International Preliminary Report on Patentability and Written Opinion issued Apr. 19, 2012 in International Application No. PCT/JP2009/065947 (English translation only).
U.S. Appl. No. 14/104,221, filed Dec. 12, 2013, Yang et al.

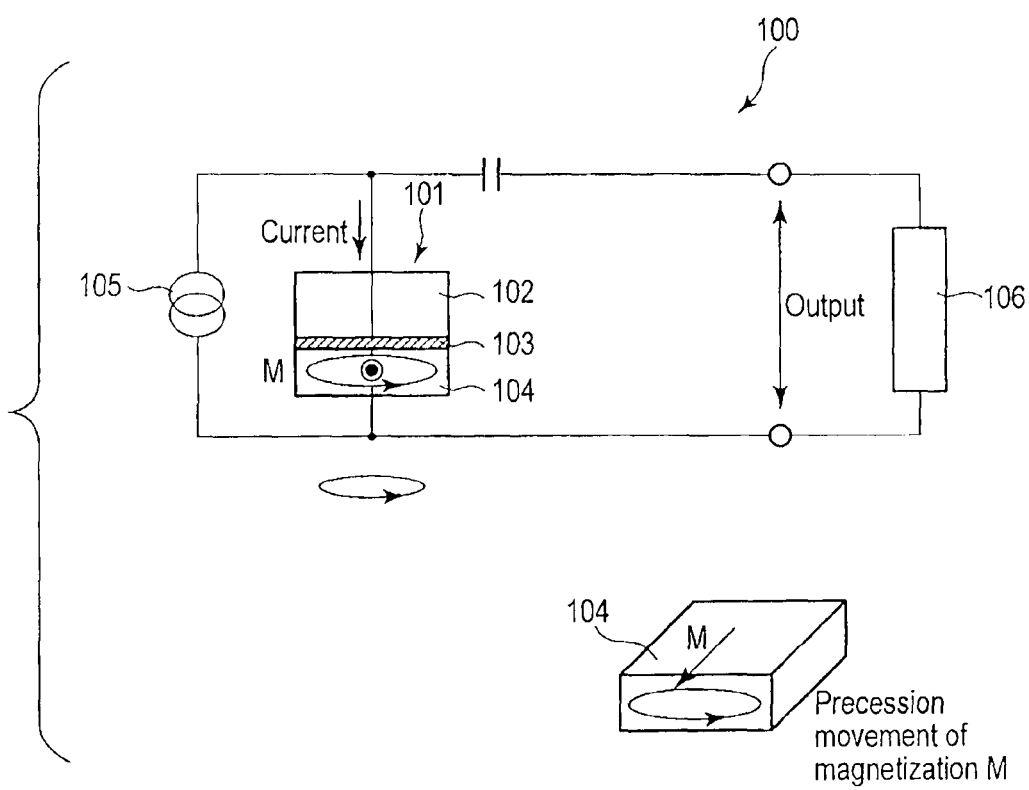
F I G. 1

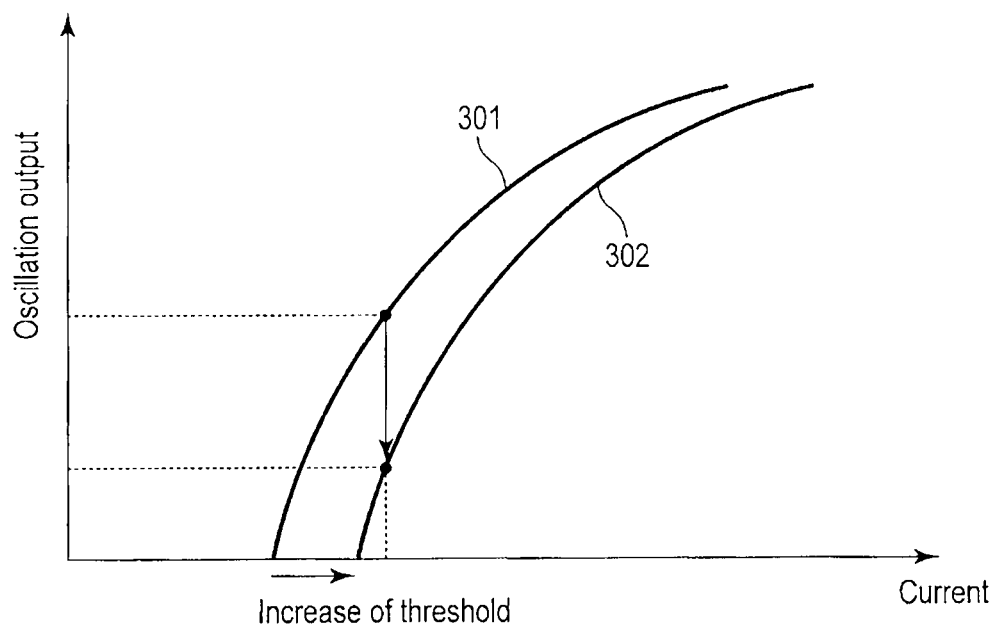
F I G. 3

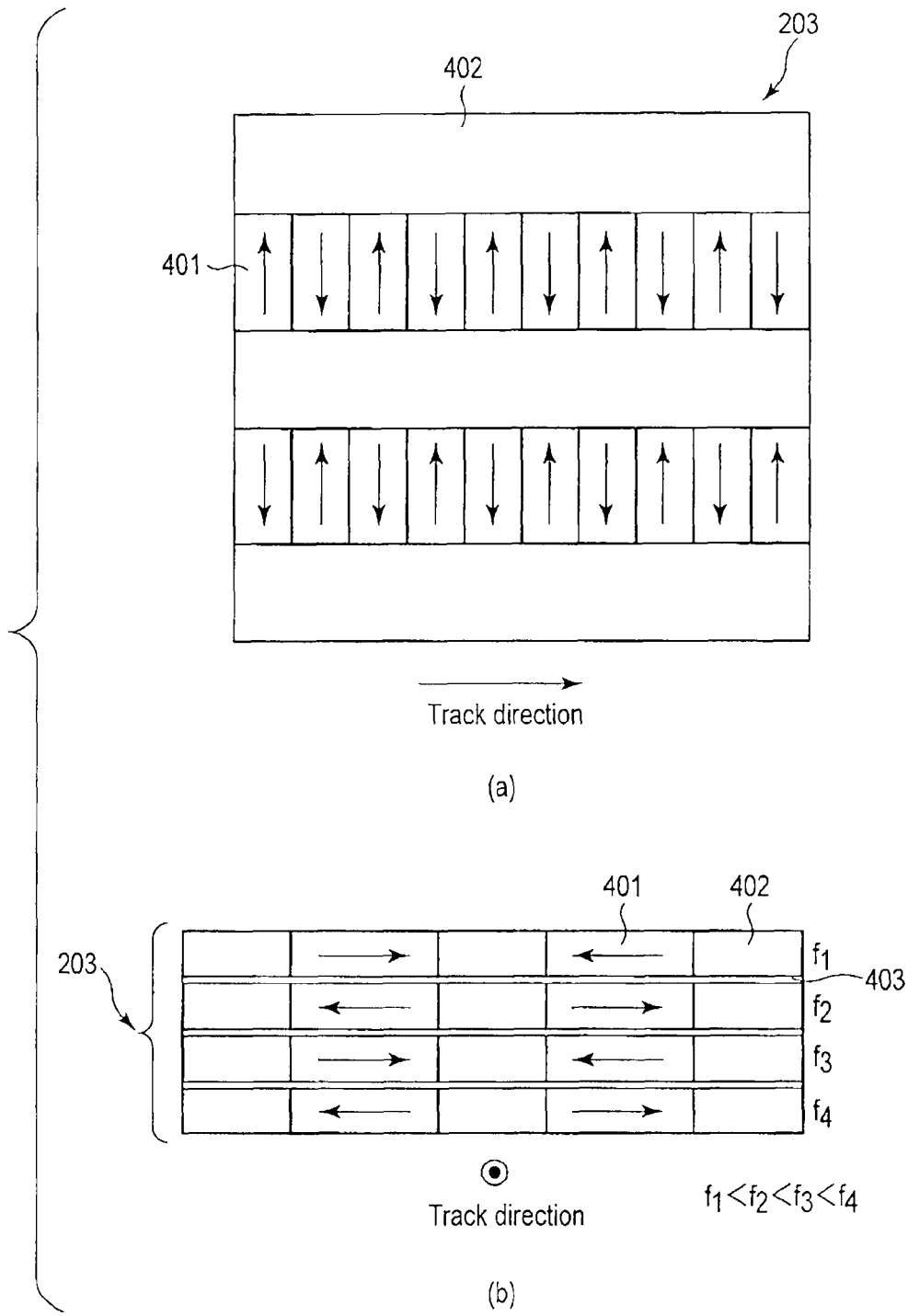
F I G. 4

Track direction (a)

Track direction (b)

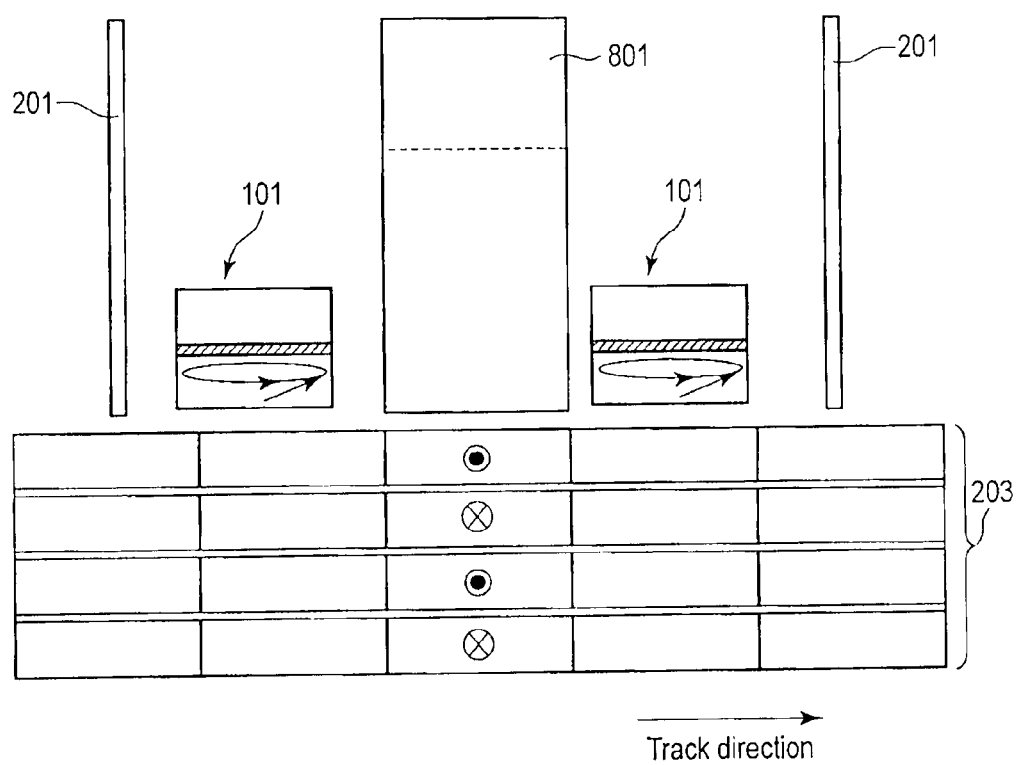
F I G. 12

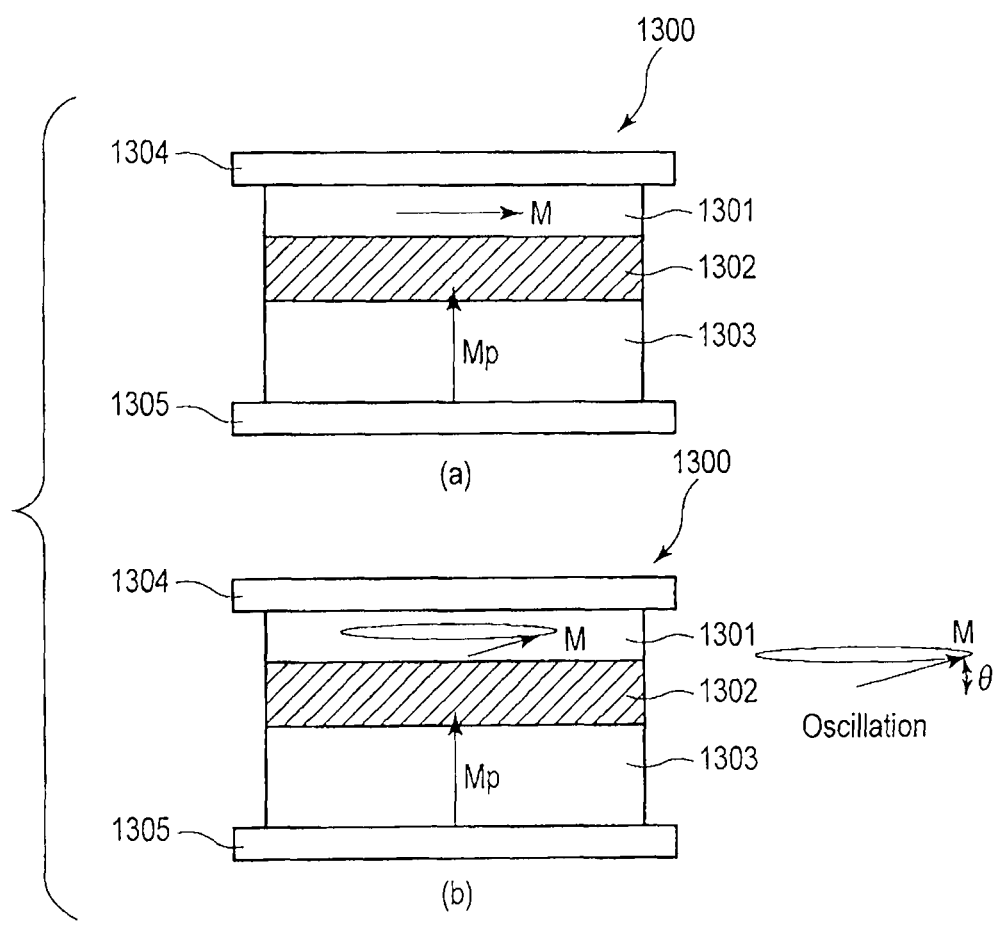
F I G. 13

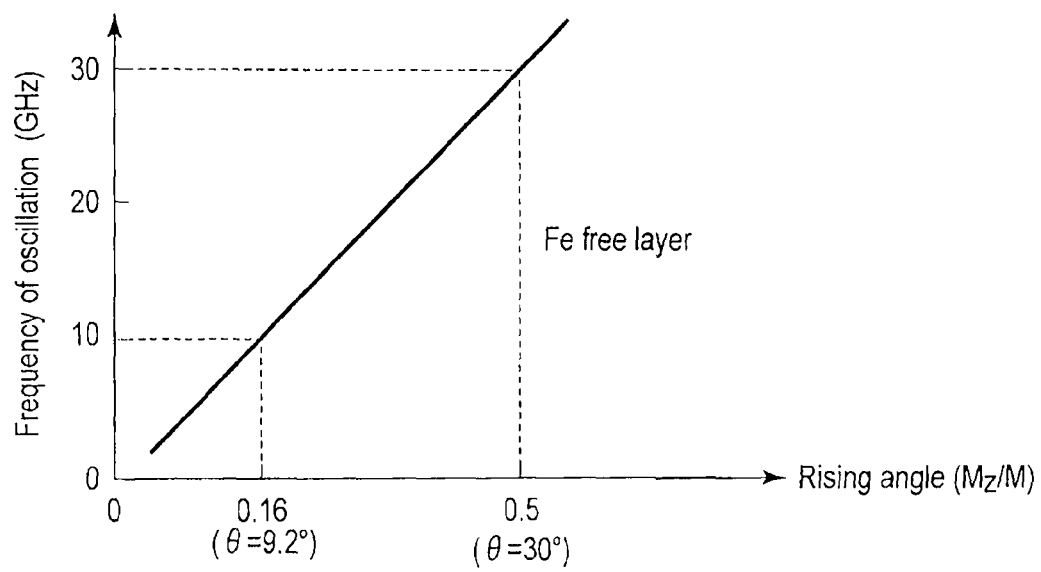
F I G. 14
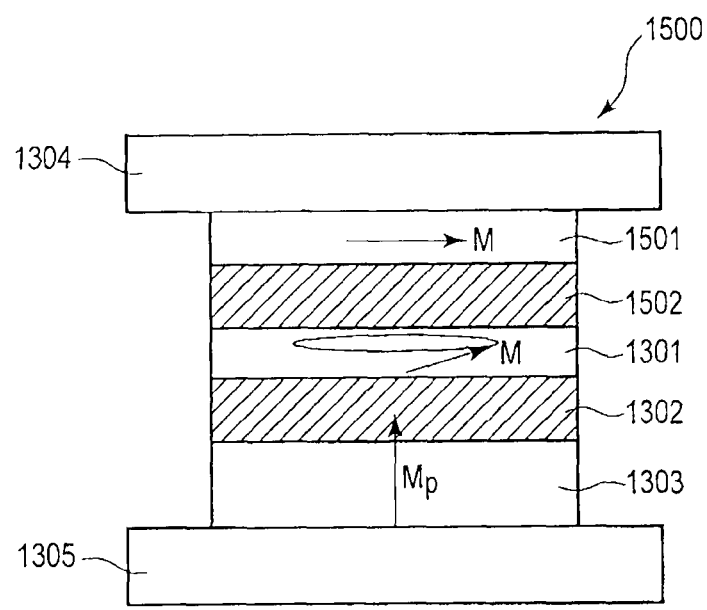
F I G. 15

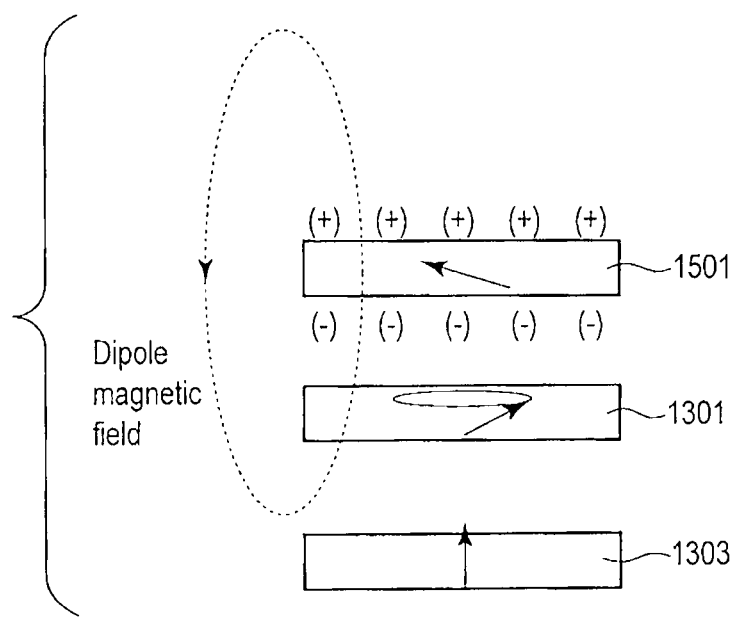
F I G. 16
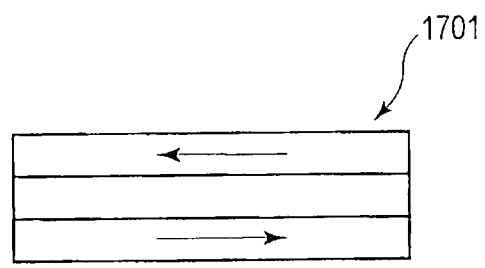
F I G. 17

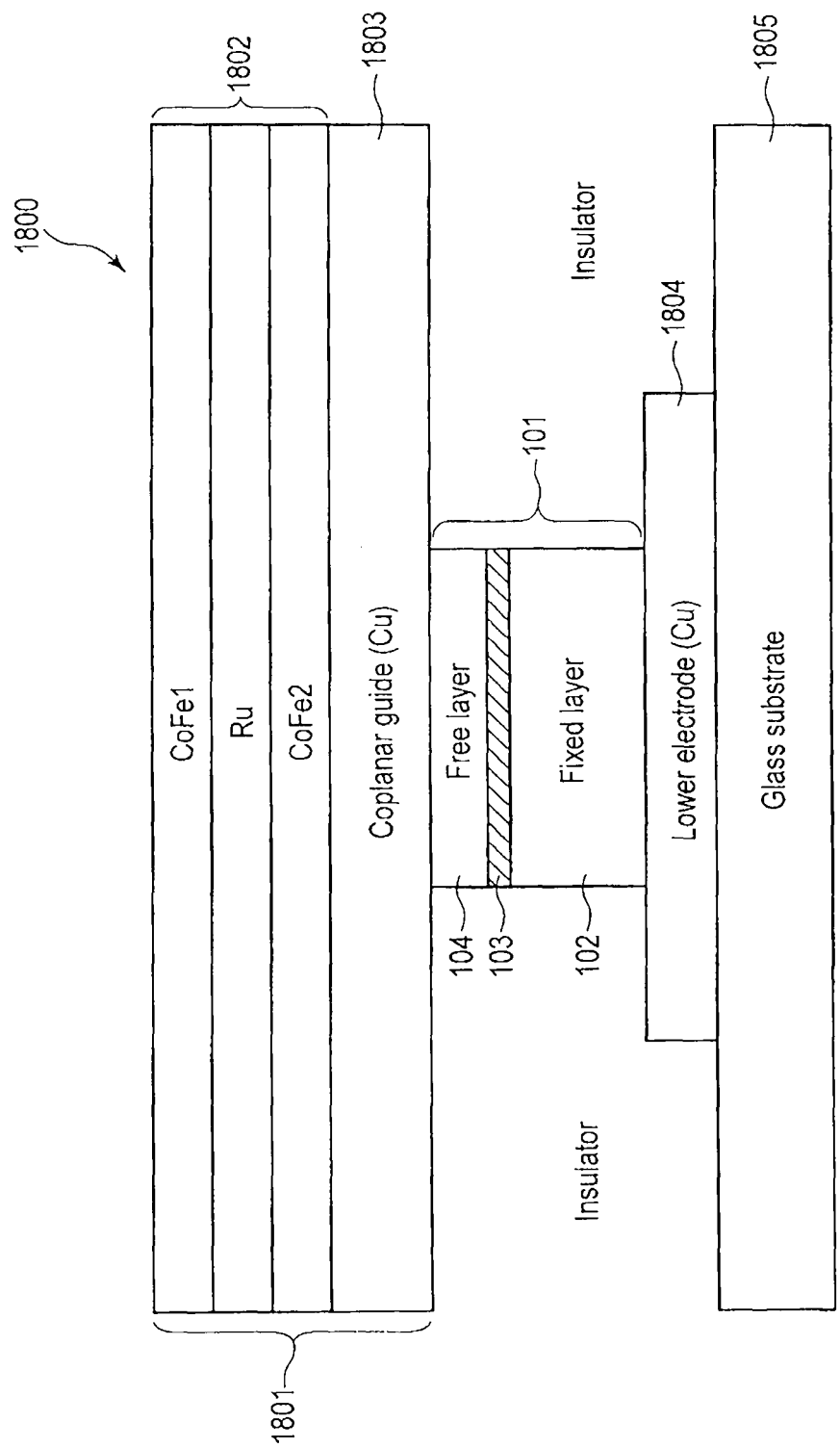
F I G. 18

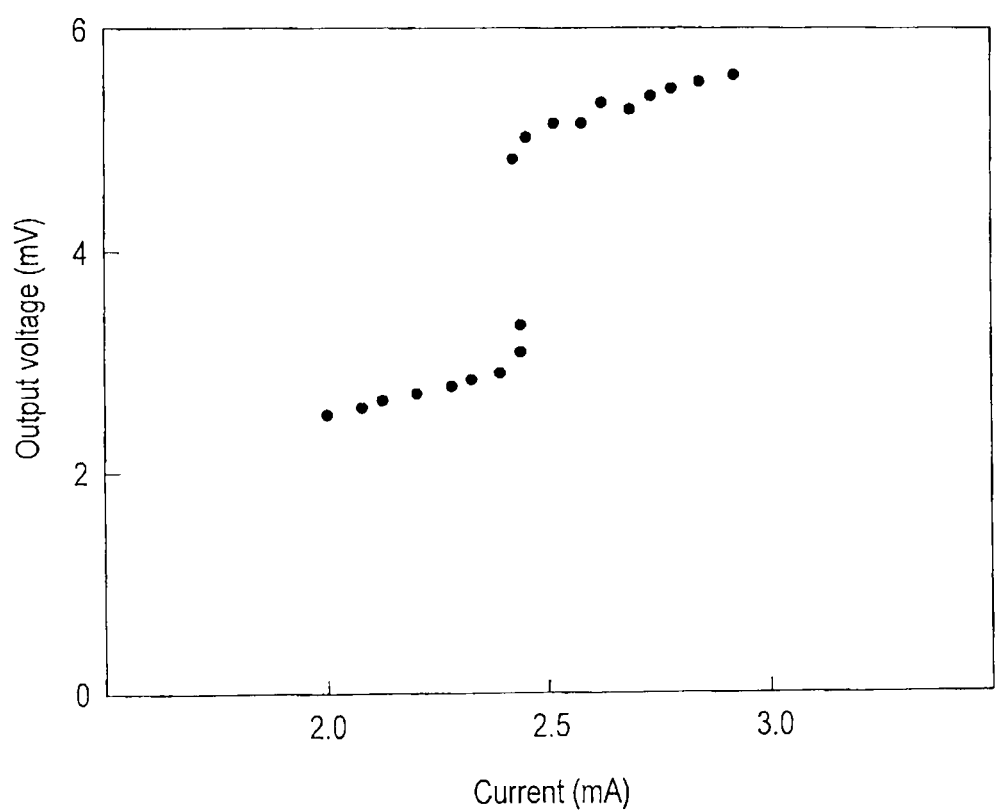
F I G. 20

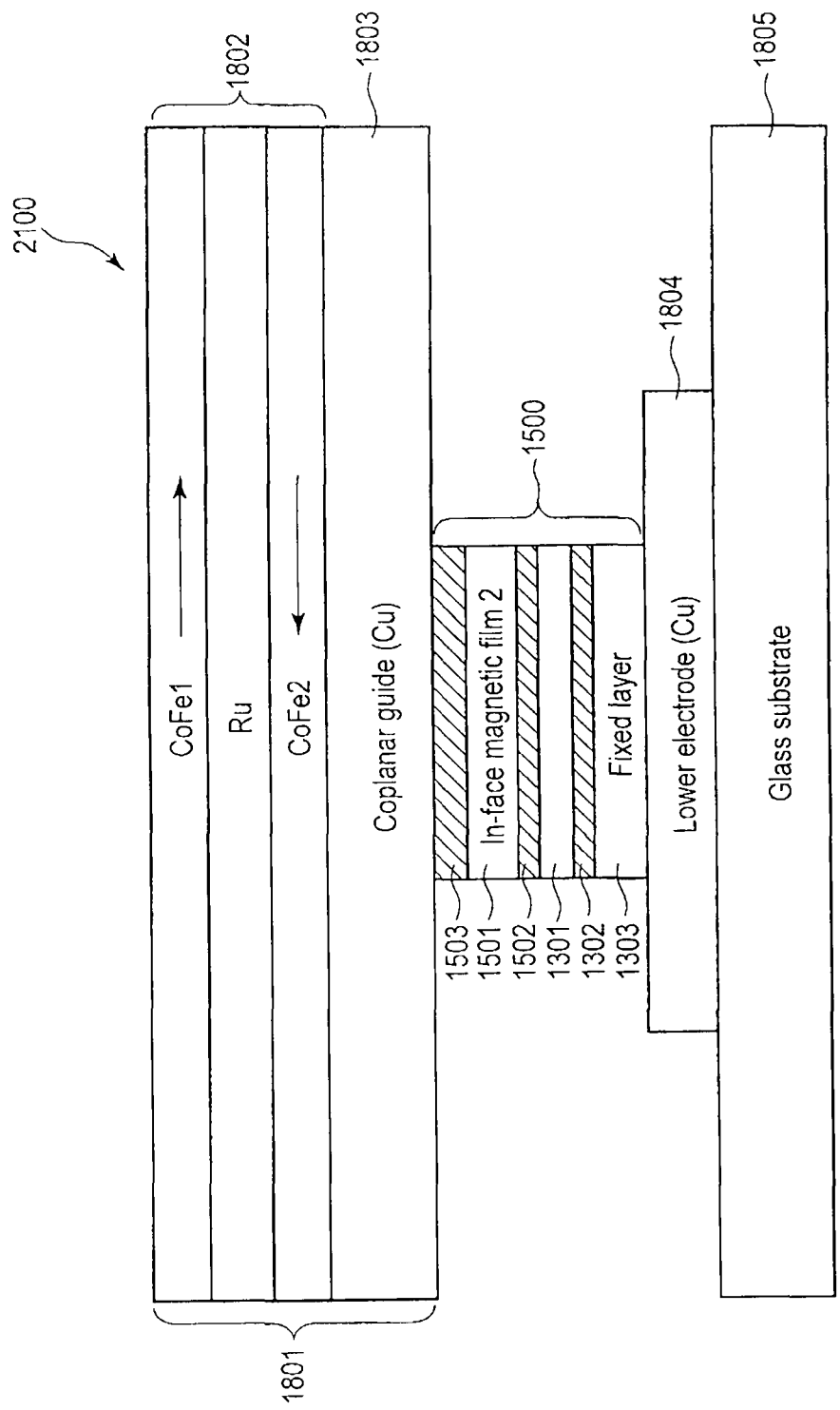
F I G. 21

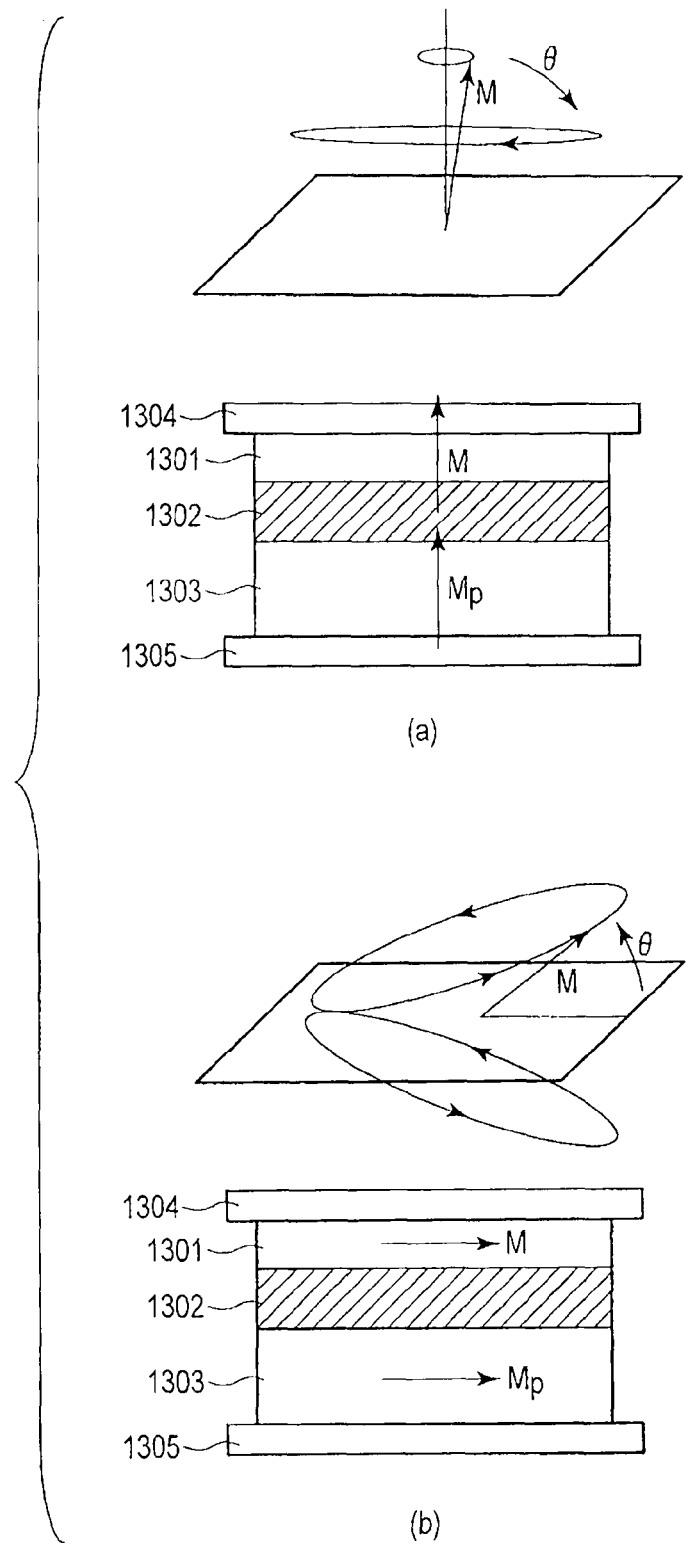
F I G. 24

THREE-DIMENSIONAL MAGNETIC RECORDING AND REPRODUCING APPARATUS INCLUDING A PLURALITY OF MAGNETIC LAYERS HAVING DIFFERENT RESONANT FREQUENCIES

CROSS REFERENCE TO RELATED APPLICATIONS

This application is a Continuation Application of PCT Application No. PCT/JP2009/065947, filed Sep. 11, 2009, the entire contents of which are incorporated herein by reference.

FIELD

Embodiments described herein relate generally to a three-dimensional magnetic recording and reproducing apparatus.

BACKGROUND

In recent years, a magnetic head using a micro magnetic oscillator, which has higher sensitivity than a conventional giant magnetoresistive (GMR) element, has been proposed to avoid magnetic white noise and spin transfer noise, and to improve recording density of magnetic recording. (See, e.g., JP-A 2005-285242 (KOKAI).)

BRIEF DESCRIPTION OF THE DRAWINGS

FIG. 1 is a block diagram illustrating a three-dimensional magnetic recording and reproducing apparatus according to the present embodiment.

FIG. 3 is a diagram illustrating the relationship between an oscillation output and a current.

FIG. 4 is (a) diagram illustrating an upper surface of a three-dimensional storage medium on which the data item is stored by longitudinal magnetic recording, and (b) a sectional view of the three-dimensional storage medium.

FIG. 12 is an explanatory diagram illustrating the ring-type magnetic pole used for reading the data item from and writing the data item to the storage medium.

FIG. 13 is a diagram showing a variation of the structure of the spin-torque oscillator.

FIG. 14 is an explanatory diagram of magnetization angle dependence of the oscillation frequency in the micro magnetic oscillator.

FIG. 15 is a diagram illustrating an example of the spin-torque oscillator to which an in-plane magnetization film is added.

FIG. 16 is an explanatory diagram of dipole magnetic field due to the in-plane magnetization film.

FIG. 17 is an explanatory diagram of an artificial antiferromagnetic material.

FIG. 18 is a diagram illustrating a laminated structure used in the first example.

FIG. 20 is a diagram illustrating a result of the experiment on current dependence of an output voltage of the spin-torque oscillator.

FIG. 21 is a diagram illustrating a laminated structure used in the second example.

FIG. 24 is a diagram showing an example of a conventional spin-torque oscillator used for microwave assist.

DETAILED DESCRIPTION

Figure 2:
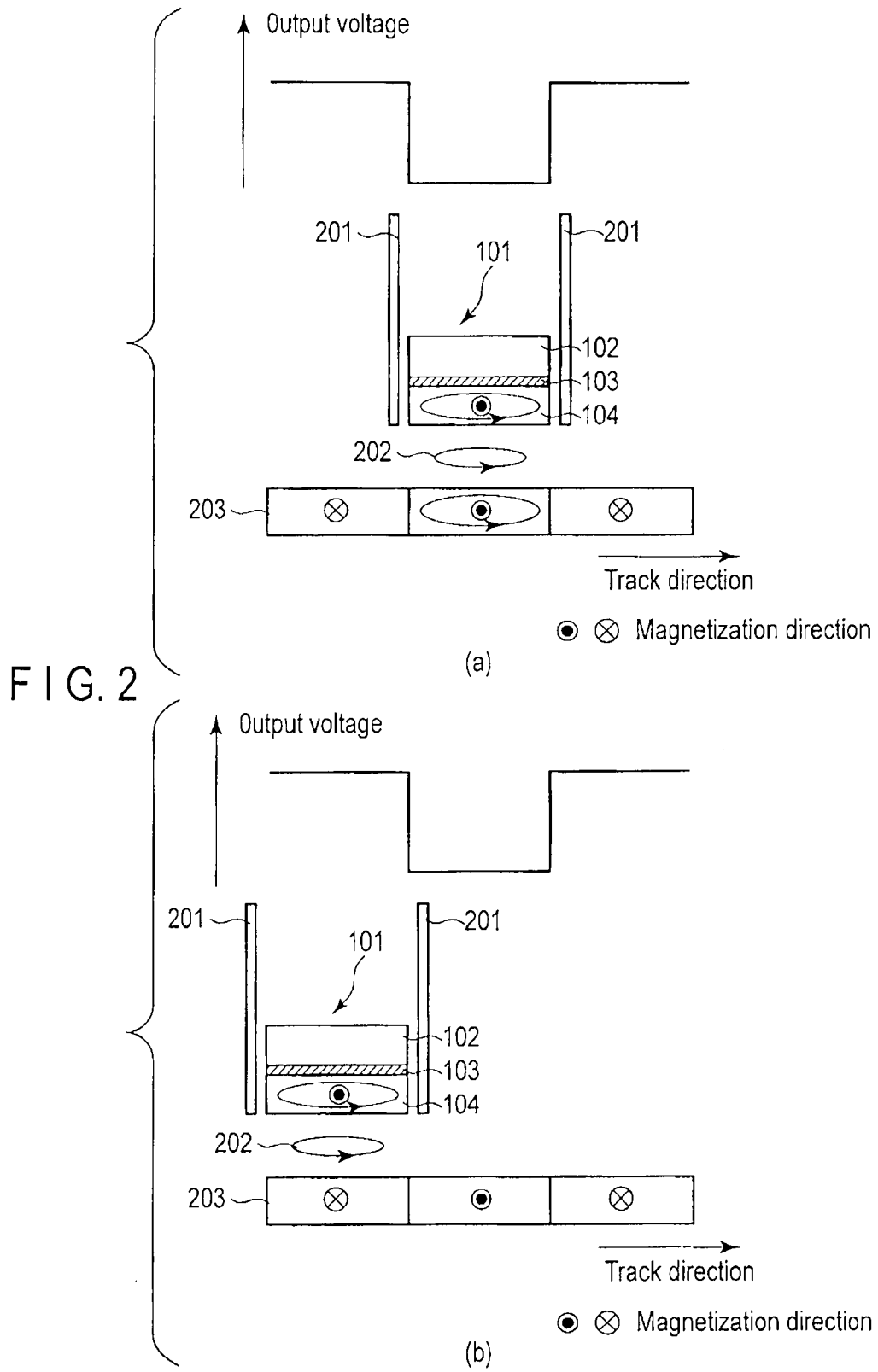
FIG. 2 is an explanatory diagram of a method of reading a data item from a storage medium using magnetic resonance.

Since the development of GMR head using the giant magnetoresistance (GMR) effect, remarkable progress in recording density of magnetic recording has been made. A GMR element is a laminated film formed of two ferromagnetic layers and a non-magnetic layer therebetween. In a GMR element, exchange bias is applied to one of the ferromagnetic layers to stabilize magnetization, and the magnetization direction of the other ferromagnetic layer is in parallel with external magnetic field, and the change in a relative angle of the magnetization directions of the two ferromagnetic layers is detected as a change in a resistance. This is called the magnetoresistance effect of a spin bulb film. The GMR element uses the effect. A CIP-GMR element that feeds current through the film plane of a spin bulb film and detects a change in resistance, and a CPP-GMR element that feeds current perpendicularly to a spin bulb film to detect a change in resistance are developed. The magnetoresistance ratio (MR ratio) of each of the CIP-GMR element and the CPP-GMR element is only a few percent, and those elements are capable of supporting recording density of 200 Gbit/inch$^2$.

To support higher density in magnetic recording, development of a tunnel magnetoresistive (TMR) element using the TMR effect has been in progress. A TMR element has two ferromagnets and a thin insulator therebetween. A tunnel current flows when a voltage is applied from one ferromagnetic film to another. A TMR element is used to detect a change in a relative angle of magnetization as a tunnel resistance, utilizing a change in magnitude of tunnel current due to the magnetization direction of the upper and lower ferromagnetic layers. The TMR element has an MR ratio of 100% at maximum. Since the effect found in a TMR junction is greater than that in a GMR junction, a signal voltage in the TMR junction is also great. However, not only the signal component, but also a noise component due to shot noise also becomes significant; as a result, there is a problem that a signal-to-noise ratio does not improve. Shot noise is due to random fluctuations of an electric current caused when electrons irregularly pass through a tunnel barrier. Shot noise increases in proportion to a square root of tunnel resistance. Accordingly, in order to reduce shot noise and to acquire a necessary signal voltage, it is necessary to make a tunnel-insulating layer thin and to lower a tunnel resistance. As greater recording density becomes, the size of element should be as small as a recording bit. Accordingly, as greater storage density becomes, a junction resistance of a tunnel-insulating layer should be small; in other words, the layer should be thin. With the storage density of 300 Gbit/inch$^2$, a junction resistance smaller than 1Ω·cm2 is necessary. A tunnel-insulating layer having a thickness of two layers of atom in terms of the thickness of Al—O (aluminum oxide film) layer should be formed. The thinner the tunnel-insulating layer becomes, the more frequently short circuits are formed between the upper and lower electrodes; as a result, a MR ratio will be degraded, and manufacturing of elements will be extremely difficult. For the above reasons, the limit of TMR element is assumed to be around 300 Gbit/inch$^2$. Although those aforementioned elements utilize a magnetoresistance effect in a broad sense, there are problems common in those MR elements, such as magnetic white noise and spin transfer noise. Being different from electric noises, such as the aforementioned shot noise, those noises are due to fluctuations of magnetization; therefore, the noises are more dominant as the miniaturization of MR elements. Normally, it is assumed that the noises are more significant than electric noises in elements above 200 to 300 Gbpsi.

Therefore, a three-dimensional storage medium in which recording layers in which a data item is recorded are multi-layered has been proposed as a solution to improve storage density significantly. To realize such a medium, a technique of reading the data item from and writing the data item on each layer will be required.

In general, according to one embodiment, a three-dimensional magnetic recording and reproducing apparatus includes a magnetic head and a magnetic storage medium. The magnetic head includes a spin-torque oscillator, the magnetic oscillator including a free layer, a first non-magnetic layer and a fixed layer, magnetization of the free layer being rotatable, the first non-magnetic layer being laminated on the free layer, the fixed layer being laminated on the first non-magnetic layer, magnetization direction of the fixed layer being fixed. The magnetic storage medium includes a plurality of first magnetic layers formed of magnetic materials having different resonant frequencies, each of the first magnetic layers being formed of an in-plane magnetization film and having recording tracks.

In the following, the three-dimensional magnetic recording and reproducing apparatus according to the present embodiment will be described in detail with reference to the drawings. In the embodiment described below, units specified by the same reference number carry out the same operation, and may only be explained once.

The structure of the three-dimensional magnetic recording and reproducing apparatus according to the present embodiment will be described in detail with reference to FIG. 1.

The three-dimensional magnetic recording and reproducing medium 100 according to the present embodiment includes a spin-torque oscillator 101, a DC current source 105 and a load 106.

The spin-torque oscillator 101 includes a fixed layer 102, a tunnel-insulating layer 103, and a free layer 104, and these layers are laminated in the order as listed. The oscillator 101 is in the size of a few tens of nanometers. The spin-torque oscillator 101 is used as a reading oscillator when reading a data item from a storage medium, and used as an assist oscillator when writing the data item to a storage medium.

For the fixed layer 102, Co, Co/non-magnetic lamination film, or CoCr type alloy, such as CoCrTa, CoCrTaPt, CoTaNb, are used as a magnetization film, but not limited thereto. A Co multi-layer film, such as Co/Pd, Co/Pt, Co—Cr—Ta/Pd, CoCrPt type alloy, FePt type alloy, SmCo type alloy including rare earth, or TbFeCo alloy can also be used. The magnetization direction is fixed on the fixed layer 102.

For the tunnel-insulating layer 103, Al—O (aluminum oxide film), etc. is used as an insulating film.

For the free layer 104, a magnetic material with large saturated magnetization, such as Fe, FeCo alloy, is used, because large saturated magnetization M is necessary to obtain a strong high-frequency magnetic field. In the free layer 104, the magnetization rotates freely.

The DC current source 105 feeds a direct current to the spin-torque oscillator 101.

The load 106 is used to read a high-frequency voltage in a range between a few gigahertz and a few tens of gigahertz which is caused by the TMR effect between the magnetization of the free layer 104 on which precession occurs and the fixed layer 102.

Next, the operation of the spin-torque oscillator 101 at the time of reading from and writing to a storage medium is described in detail with reference to FIG. 1.

First, the DC current source 105 feeds a direct current to the micro magnetic oscillator 101. If a direct current value is greater than a threshold, the magnetization M of the free layer 104 in the spin-torque oscillator 101 begins precession. The precession of the magnetization M of the free layer 104 is shown in the bottom right of FIG. 1. Thus, the precession occurs with respect to the magnetization direction when current is zero as a reference.

Because of the TMR effect, a high-frequency voltage ranging from a few gigahertz to a few tens of gigahertz is generated between the free layer 104 and the fixed layer 102, and the voltage is output to the load 106. In addition, in proximity to the spin-torque oscillator 101, a high-frequency (rotating) magnet field (from a few gigahertz to a few tens of gigahertz) due to the precession of the free layer magnetization is generated. Thus, in the present embodiment, the data item is read from and written to a magnetic storage medium utilizing both of the voltage (power) output and the high-frequency magnetic field. The high-frequency magnetic field is sometimes referred to as a microwave magnetic field or a near field.

Next, a method of reading data item stored on a storage medium utilizing the magnetic resonance phenomenon will be explained in detail, with reference to FIGS. 2(a) and 2(b). For brevity, the recording layer of the storage medium is a single layer in the explanation.

As a magnetic head in the present embodiment, a spin-torque oscillator 101 built in a magnetic shield to be used as a sensor for detecting magnetic resonance of a medium is used. As described above, the high-frequency magnetic field 202 caused by the precession of the magnetization of the free layer 104 included in the micro magnetic oscillator 101 affects the magnetization of the storage medium 203 which is arranged immediately below the spin-torque oscillator 101.

If a frequency of oscillation of the spin-torque oscillator 101 is set at the same as the resonant frequency of the magnetization of the storage medium 203 in advance, the storage medium 203 exhibits the magnetic resonance phenomenon if the magnetization direction of the storage medium 201 immediately below the spin-torque oscillator 101 is parallel to the direction of the free layer magnetization. Once the magnetic resonance phenomenon occurs, the storage medium 203 absorbs energy of the high-frequency magnetic field 202. For the spin-torque oscillator 101, this phenomenon means that the energy of the spin-torque oscillator 101 is absorbed in by the storage medium 203 by resonance absorption, and the energy loss for the spin-torque oscillator 101 increases.

The relationship between an oscillating output (is also referred to as output voltage) of the spin-torque oscillator 101 and the DC current source 105 will be explained in detail with reference to FIG. 3.

A curve 301 correspond to a state in which resonance does not occur between the spin-torque oscillator 101 and the storage medium 203, and a curve 302 corresponds to a state in which resonance occurs between the spin-torque oscillator 101 and the storage medium 203. Although energy supplied from a current and an energy loss are balanced for the oscillation of the spin-torque oscillator 101, if a new loss is caused by resonance absorption as shown in FIG. 3, a threshold current of oscillation increases. In other words, under a certain current level, an output voltage value on the curve 302 is less than an output voltage value on the curve 301.

On the other hand, in FIG. 2(b), if the magnetization direction of the storage medium 203 immediately below the micro magnetic oscillator 101 is in antiparallel to the magnetization direction of the free layer 104, since the direction of the precession occurring on the magnetization of the storage medium 203 and the rotation direction of the high-frequency magnetic field 202 caused by the magnetization of the free layer 104 are opposite, the storage medium 203 does not indicate magnetic resonance. In this case, no new loss occurs at the spin-torque oscillator 101, and thus, the output voltage is not decreased. In other words, the magnetization direction stored in the storage medium 203 can be detected by the amplitude of the oscillating output of the spin-torque oscillator 101, and thus, data item can be read. A phase of a voltage changes as an output voltage changes. It is also possible to read data item stored in the storage medium 203 by detecting a phase change instead of a voltage change.

Next, an example of the three-dimensional magnetic storage medium using a longitudinal magnetic recording scheme adopted in the present embodiment will be explained in detail with reference to FIGS. 4(a) and 4(b). As shown in FIGS. 4(a) and 4(b), the magnetization direction of each bit 401 is indicated by the arrows. A bit can be expressed with a region indicating one magnetization direction. The magnetization direction of each bit 401 is on the same plane, and is perpendicular to a track direction. In other words, a magnetic flux of the bits 401 is trapped in the plane, and there is no magnetic flux leakage from the storage medium 203. Such a structure cannot be used for a conventional magnetic recording scheme in which leakage magnetic field from the storage medium 203 is detected to read data item; on the other hand, data item can be read with the magnetic recording scheme of the present embodiment using the magnetic resonance phenomenon.

Further, since the magnetostatic interaction between the bits 401 is weak in the storage medium 203 shown in FIG. 4(a), a high recording density can be achieved for the storage medium 203. Since there is almost no magnetic flux leakage from the magnetic layer 402, it is possible to achieve three-dimensional data recording by layering multiple recording layers. As an example, FIG. 4(b) shows a sectional view of the storage medium 203 formed of four layers.

The storage medium 203 on which data item is three-dimensionally stored is made by layering the magnetic layer 402 on which data item is stored and the non-magnetic layer 403 alternately. Each of the magnetic layers 402 separated by the non-magnetic layers 403 is made of magnetic materials having different resonant frequencies $f_1$, $f_2$, $f_3$ and $f_4$. From a magnetic layer 402 nearest to the magnetic head to a magnetic layer 402 farthest from the magnetic head (to a lower layer in FIG. 4(b)), magnetic layers 402 are arranged in an ascending order of resonant frequency; in other words, the resonant frequency of magnetic layers 402 are $f_1<f_2<f_3<f_4$. The reason of the ascending order will be explained later with reference to FIG. 7.

Figure 5:
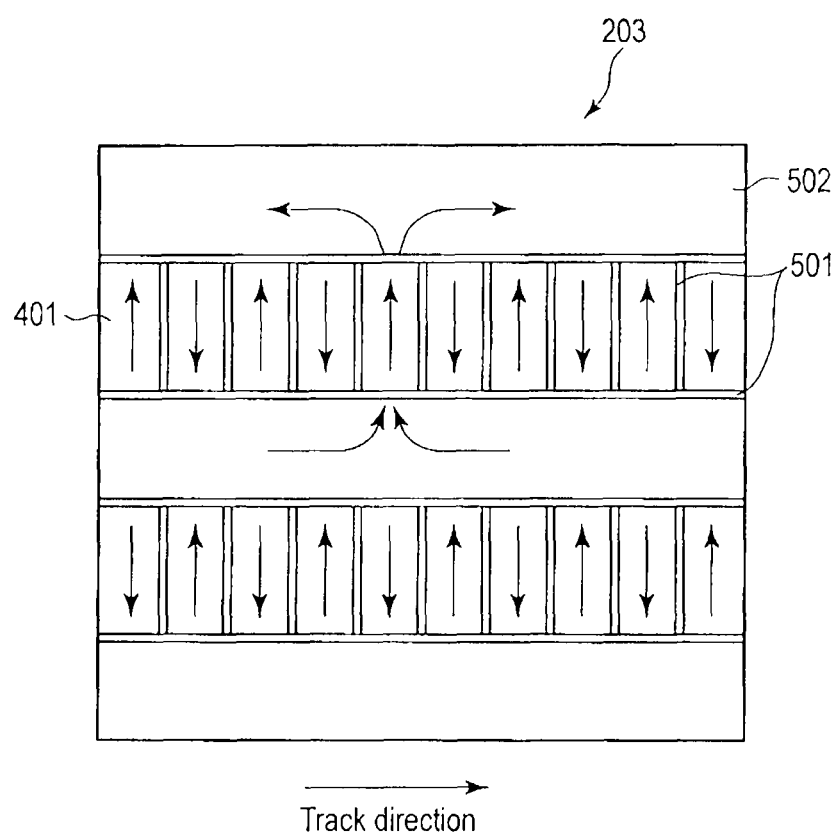
FIG. 5 is (a) diagram illustrating an upper surface of the three-dimensional storage medium using patterned media for longitudinal magnetic recording, and (b) a sectional view of the three-dimensional storage medium.
Figure 5:
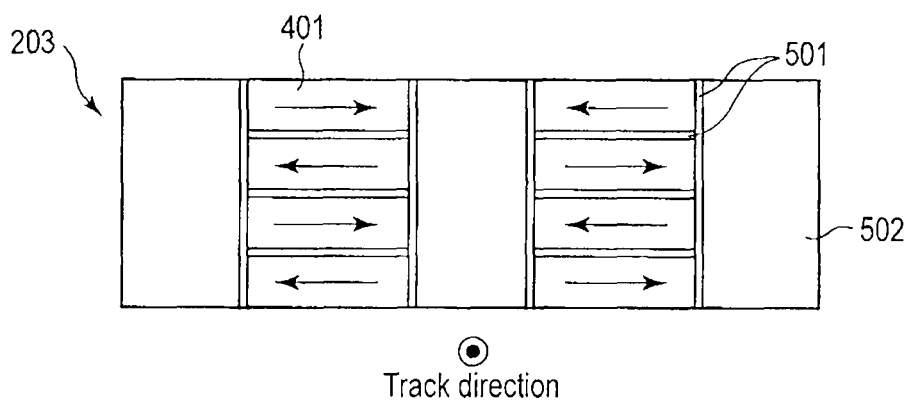

A patterned media may be used in place of the storage medium 203 shown in FIG. 4. FIG. 5 shows an example of a storage medium formed of patterned media. As shown in FIGS. 5(a) and 5(b), each bit 401 uses a magnetic material having strong anisotropy separated by a non-magnetic material 501, and is surrounded by the non-magnetic material 501 in the track direction, and is also surrounded by the non-magnetic material 501 in the direction of substrate (the layering direction of the magnetic layers). By arranging a soft magnetic material 502 around the non-magnetic material 501, each bit 401 can be aligned regularly. As a result, density and stability of data item recording can be improved. Further, not limited to the longitudinal magnetic recording scheme shown in FIGS. 4 and 5, a perpendicular magnetic recording scheme can be used.

Next, a method of reading data item from a three-dimensional storage medium, i.e., a storage medium wherein its recording layer is multi-layered, will be explained in detail with reference to FIGS. 6(a) and 6(b). For brevity, in the following explanation, the recording layer of the storage medium has two layers, and data item that a user wants to read is stored in the second recording layer, and different data item is stored in the first recording layer.

As described above, the first and second layers of the storage medium 203 have magnetic materials having different resonant frequencies. If the resonant frequency of the first recording layer is $f_1$ and that of the second recording layer is $f_2$, the spin-torque oscillator 101 having frequency of oscillation $f_2$ to read data item stored on the second layer. Since the frequency of oscillation $f_2$ of the micro magnetic oscillator 101 is different from resonant frequency $f_1$ of the first layer, the magnetic material of the first layer does not indicate resonance absorption regardless of the magnetization direction.

Figure 6:
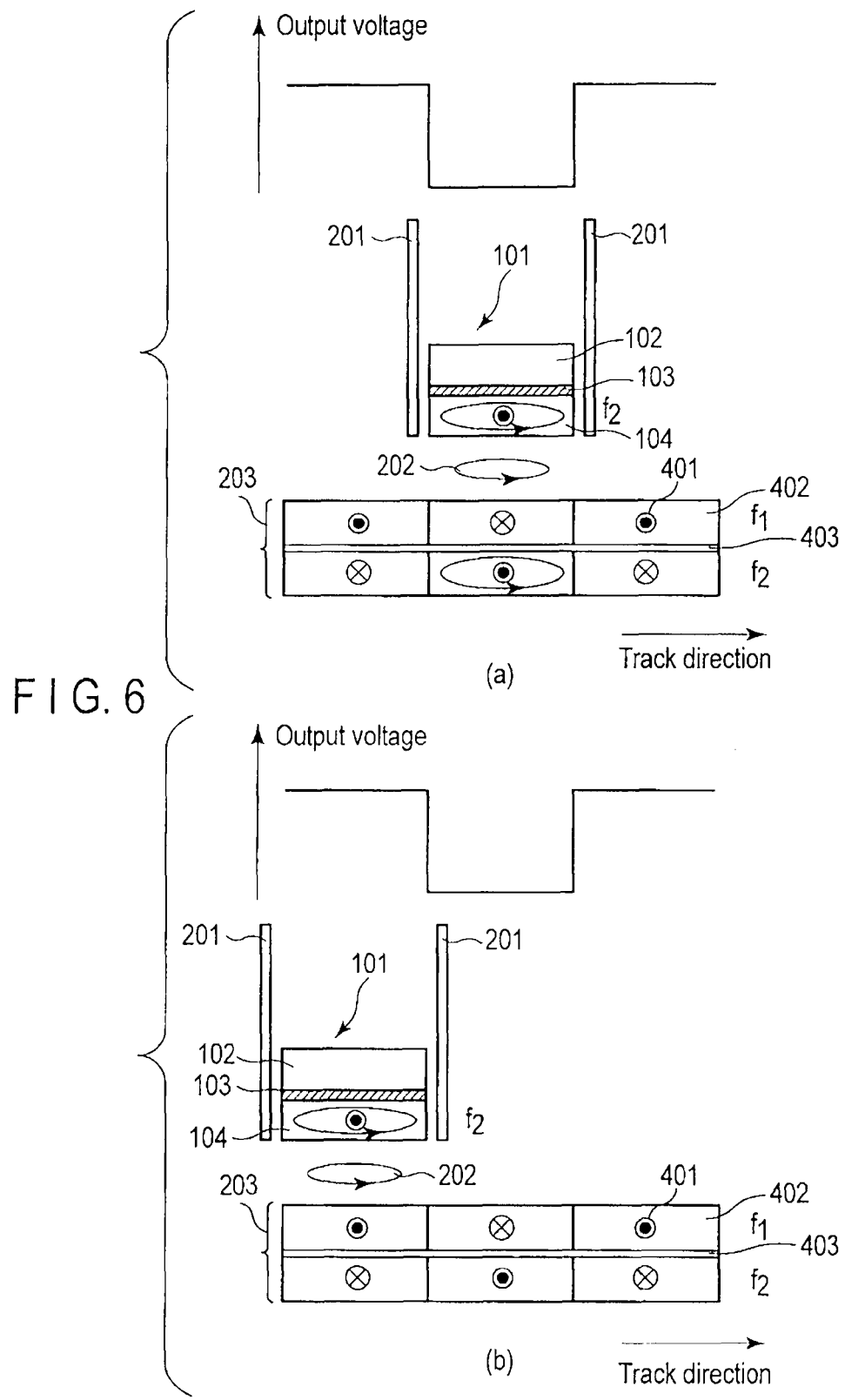
FIG. 6 is a diagram explaining the method of reading the data item from the three-dimensional storage medium.

On the other hand, as shown in FIG. 6(a), if the magnetization of the bit 401 of the second layer immediately below the micro magnetic oscillator 101 is parallel to the magnetization of the free layer 104, the magnetization indicates resonance absorption. As a result, the output voltage of the spin-torque oscillator 101 is reduced. Because of the change in the output voltage, it is possible to read data item from the second recording layer.

In the case shown in FIG. 6(b), the magnetization of the bit 401 of the second layer immediately below the micro magnetic oscillator 101 is the same as resonant frequency $f_2$ but antiparallel to the free layer magnetization, and thus, the precession direction of the magnetization is opposite; as a result, the output voltage is not reduced. In other words, as shown in FIGS. 6(a) and (b), the output voltage of the micro magnetic oscillator 101 is not affected by the magnetization direction of the first layer, and it is changed only by the magnetization direction of the second layer. Thus, the data item stored on the second layer can be read. To read the data item stored on the first layer, the spin-torque oscillator 101 having resonant frequency $f_1$. Similarly, if the storage medium 203 is formed of n recording layers, data item on a desired layer of the three-dimensional storage medium can be selectively read by using n different resonant frequencies, from $f_1$ to $f_n$. N frequencies of oscillation can be acquired by changing a frequency of a spin-torque oscillator 101, or by using multiple spin-torque oscillators 101 having different frequencies.

The reason for layering resonant frequency of recording layer in an ascending order, from a surface layer of storage medium to a lower layer of storage medium will be explained below in detail with reference to FIG. 7.

Figure 7:
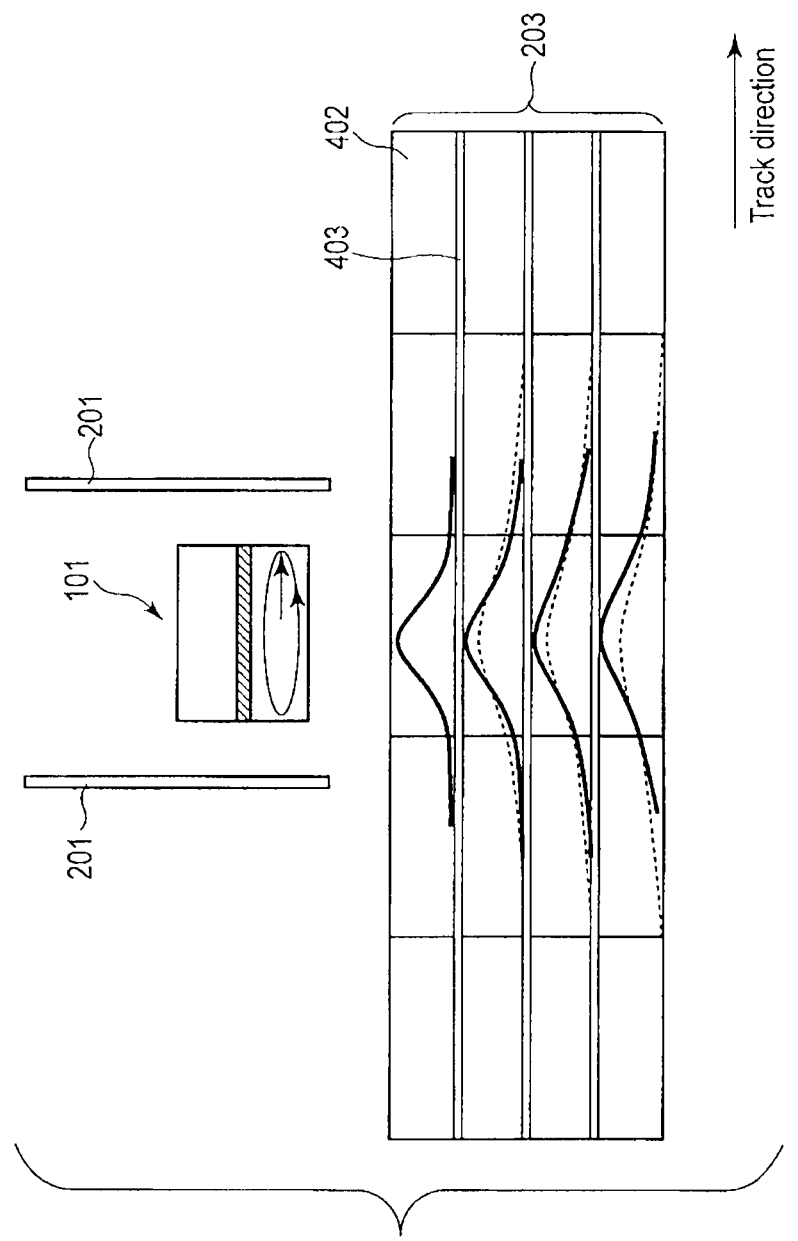
FIG. 7 is a diagram showing intensity distribution of a high-frequency magnetic field in the three-dimensional storage medium.

FIG. 7 indicates intensity distribution of a high-frequency magnetic field in each recording layer (magnetic layer). If the storage medium 203 stores data in a three-dimensional manner, the intensity distribution of a high-frequency magnetic field of the spin-torque oscillator 101 spreads as indicated by broken lines, from the surface to the lower layer of the storage medium 203. If this is the case, resolution of reading data item may be degraded. However, magnetic permeability of a magnetic material is rapidly decreased when a frequency is greater than a resonant frequency. Accordingly, if recording layers are arranged, from the surface layer to the lower layer, in an ascending order of the resonant frequencies of the recording layers, a resonant frequency of a recording layer closer to the surface than a recording layer to be read is lower than that of the recording layer to be read; as a result, a high-frequency magnetic field in resonance with the recording layer to be read (magnetic layer 402) can reach the recording layer to be read hardly without being affected by the recording layer closer to the surface. Thus, as indicated by solid lines in FIG. 7, the spread of high-frequency magnetic intensity and attenuation thereof, and degradation in reading resolution can be prevented.

Figure 8:
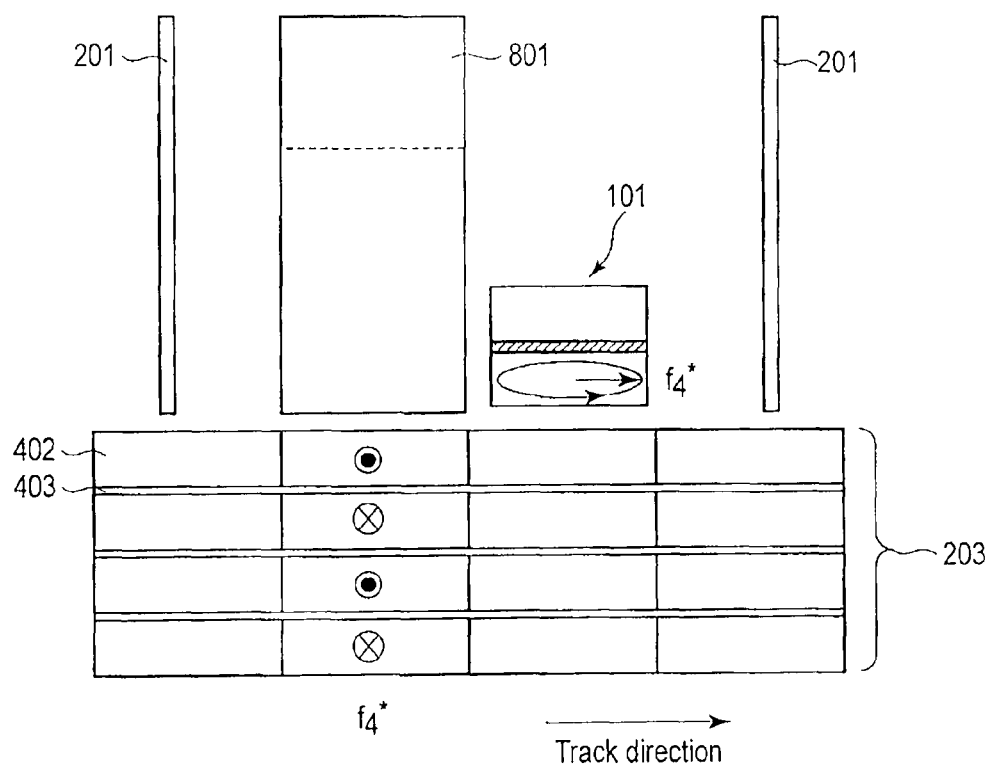
FIG. 8 is a sectional view, taken in the plane parallel to the track direction, illustrating the method of reading the data item from the three-dimensional storage medium using a ring-type magnetic pole.
Figure 9:
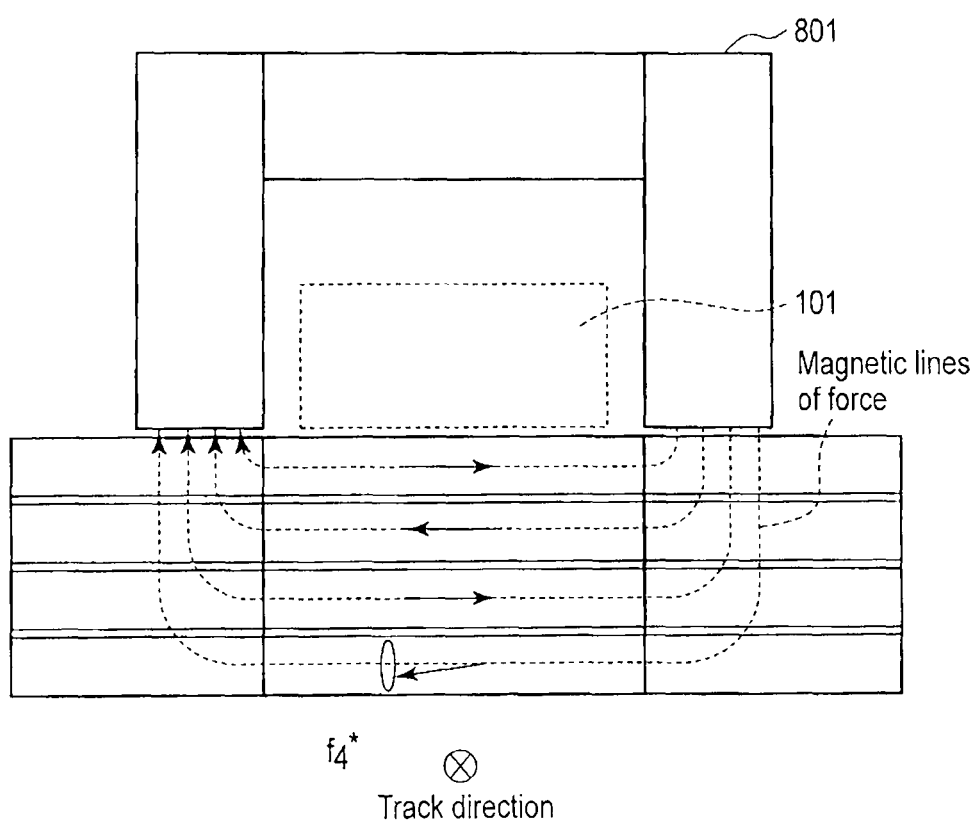
FIG. 9 is a sectional view, taken in the plane perpendicular to the track direction, illustrating the method of reading the data item from the three-dimensional storage medium using the ring-type magnetic pole.

In order to further prevent spread of high-frequency magnetic intensity and degradation in reading resolution, in addition to using the spin-torque oscillator 101 as a reading oscillator, using an auxiliary magnetic pole is effective. A sectional view of a reading head using a ring-type magnetic pole as an auxiliary magnetic pole will be explained in detail with reference to FIGS. 8 and 9. FIG. 8 is a sectional view taken in a plane parallel to the track direction, and FIG. 9 is a sectional view taken in a plane perpendicular to the track.

The reading head includes a ring-type magnetic pole 801 (hereinafter, it may be referred to as "an auxiliary magnetic pole") and the spin-torque oscillator 101. The auxiliary magnetic pole is used to select a desired bit in the recording layers, and a magnetic field applied by the auxiliary magnetic pole should be weak enough to avoid reversing the magnetization of a bit. The magnetic resonance phenomenon of the selected bit is detected as decrease of output voltage of the spin-torque oscillator 101, thereby reading the data item therefrom.

A case of reading a bit on the fourth recording layer immediately below the auxiliary magnetic pole is assumed. A magnetic field applied to the bit by the auxiliary magnetic pole is stronger than those applied to the other bits on the fourth layer; as a result, a resonant frequency changes from $f_4$ to $f_4^*$. Thus, resonance absorption selectively occurs in the bit immediately below the auxiliary magnetic pole of the fourth layer by setting a frequency of the spin-torque oscillator 101 at $f_4^*$. When an auxiliary magnetic pole is used, it may be difficult to arrange the micro magnetic oscillator 101 immediately above a bit to be read. However, as well-known, a magnetic material in resonance has a high-frequency magnetic permeability at least ten times larger than that in the non-resonance state. As a result, even when the micro magnetic oscillator 101 is not arranged immediately above a bit to be read, magnetic flux of a high-frequency magnetic field is concentrated on the bit, and a sufficiently strong high-frequency magnetic field is applied on the bit. In FIGS. 8 and 9, the auxiliary magnetic pole is in proximity of the micro magnetic oscillator 101; however, the position relationship between the auxiliary magnetic pole and the spin-torque oscillator 101 is not limited to this, as long as electromagnetic wave emitted from the spin-torque oscillator 101 reaches a bit to be read.

Figure 10:
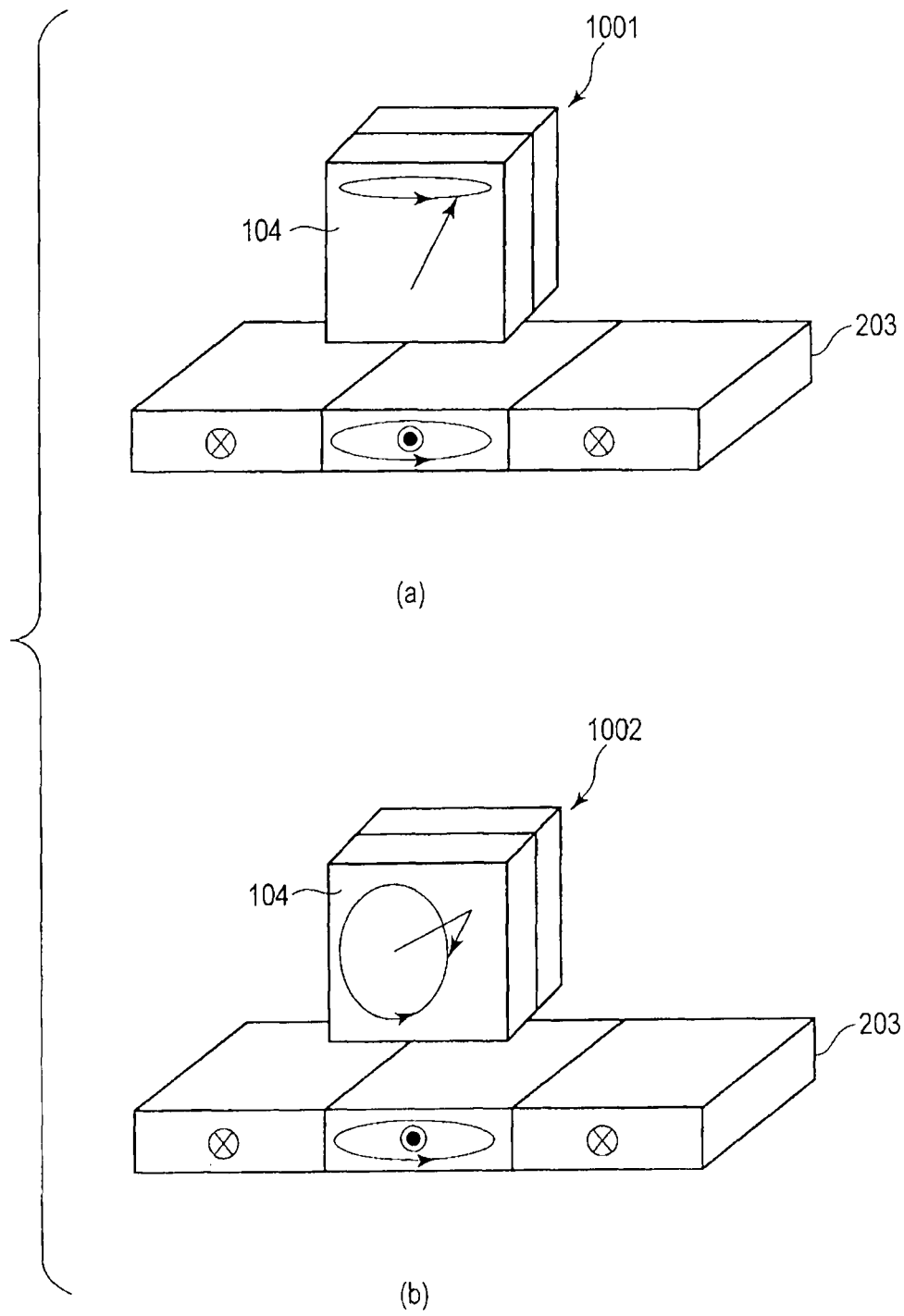
FIG. 10 is an explanatory diagram illustrating an example of the spin-torque oscillator arranged in a manner such that the magnetization of a free layer is perpendicular to the magnetization of the storage medium.

An example of arranging a spin-torque oscillator when an auxiliary magnetic pole is used is explained in detail with reference to FIGS. 10(a) and 10(b). As shown in FIG. 10(a), if the free layer 104 of the spin-torque oscillator 101 is arranged perpendicularly to the storage medium, or as shown in FIG. 10(b), if the free layer 104 is a perpendicular magnetic film, stored data item can be read. In the case shown in FIGS. 10(a) and 10(b), the high-frequency magnetic field generated by the spin-torque oscillator 101 is, different from the case shown in FIGS. 2(a) and 2(b), causes magnetic resonance absorption regardless of the magnetization direction of the storage medium 203. However, by using an auxiliary magnetic pole, it is possible to cause magnetic resonance absorption only in one direction. In other words, if a magnetic field generated by the auxiliary magnetic pole affects the magnetization of the storage medium 203, the resonant frequency of the magnetization parallel to the magnetic field is changed from f to f+Δf, and the resonant frequency of the magnetization antiparallel to the magnetic field is changed from f to f−Δf. If the frequency of oscillation of the micro magnetic oscillator 101 is set at f+Δf, magnetic resonance can be induced only in a parallel magnetization, and if at f−Δf, magnetic resonance can be induced only in an antiparallel magnetization.

That is, it becomes possible to read a desired bit selectively.

Next, a method of writing data item to a storage medium by the magnetic resonance phenomenon using an assisted magnetic recording head according to the present embodiment will be explained in detail. The structure of the assisted magnetic recording head is the same as that of the reading head using the auxiliary magnetic pole shown in FIGS. 8 and 9. It is possible to use an auxiliary magnetic pole as a recording magnetic pole, and the spin-torque oscillator 101 can be used as an assist oscillator.

A difference between the data item writing and data item reading is to apply a magnetic field generated by the recording magnetic pole and a high-frequency magnetic field generated by the oscillator more strongly in the case of data item writing than in the case of data item reading, so that magnetization reversal occurs. The spin-torque oscillator 1001 shown in FIG. 10(a) wherein the free layer 104 thereof is perpendicular to the storage medium 203 and the micro magnetic oscillator 1002 shown in FIG. 10(b) wherein the free layer 104 thereof is a perpendicular magnetic film can be used in place of the spin-torque oscillator 101 shown in FIG. 8.

An example of magnetization reversal of a bit in an nth (n is a positive number) layer immediately below a recording magnetic pole is explained below. An effect of assist due to a high-frequency magnetic field (also called a high-frequency assist method) occurs based on two principles. The first principle is resonance reversal of magnetization due to a high-frequency magnetic field, and the second principle is resonance absorption heating of magnetic material due to a high-frequency magnetic field. The former is a major principle in a medium made of magnetic material with small attenuation constant α, and the latter is a major principle in a medium made of magnetic material with large attenuation constant α.

Figure 11:
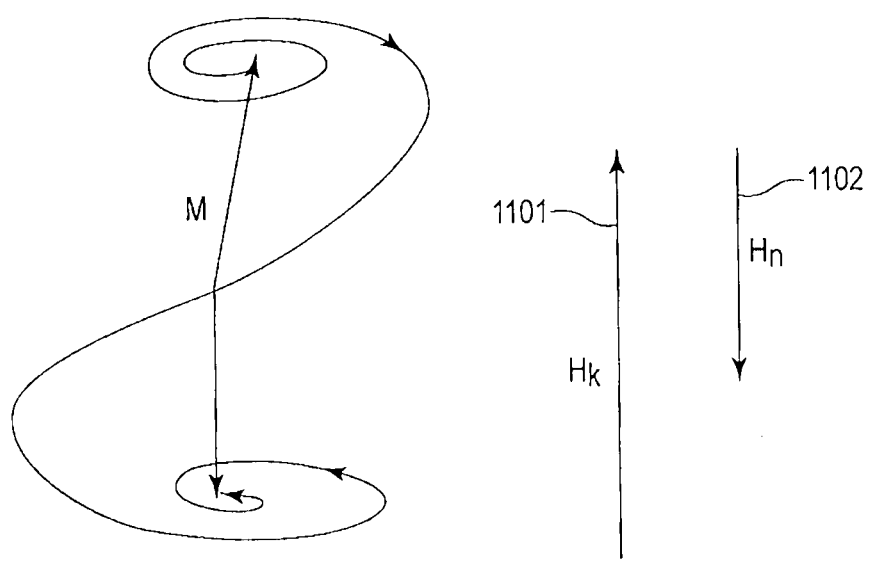
FIG. 11 is an explanatory diagram illustrating an example of magnetization reversal by high-frequency magnetic field assist.

The first principle is explained in detail with reference to FIG. 11. A recording head magnetic field $H_n$ 1102 smaller than an anisotropy magnetic field $H_k$ 1101 of the magnetic material of the nth layer is applied in a direction opposite to the magnetization M of a desired bit. Although magnetization reversal does not occur when $H_n$ is smaller than $H_k$, a high-frequency magnetic field h of a resonant frequency expressed by Eq. (1) is applied by a spin-torque oscillator concurrently, the magnetization M begins precession.

$$f_n = (\gamma/2\pi)(H_k - H_n) \tag{1}$$

If the high-frequency magnetic field is high enough, and the relationship Eq. (2) below is satisfied, the amplitude of the precession will increase as time elapses, and the magnetization M will be reversed in the end.

$$(\gamma/2\pi)h > \alpha f_n \tag{2}$$

The "γ" represents a gyromagnetic ratio. As magnetization of a bit not immediately below the recording head and magnetization of bits of the other recording layers do not satisfy Eq. (1), resonance does not occur between magnetization of those bits and the high-frequency magnetic field, and as a result, magnetization reversal does not occur. The magnetization inversion based on the first principle occurs within a period of time that is required when spin energy due to the precession of magnetization is relaxed to lattice energy; thus, a lattice temperature (temperature of a bit in a storage medium) hardly rises.

On the other hand, for a medium with a large attenuation constant α, the second principle explained above, i.e., magnetization reversal due to resonance absorption heating of a bit of a storage medium by a high-frequency magnetic field, occurs. High-frequency power P absorbed into a storage medium is dependent on the imaginary part $\chi''$ of magnetic susceptibility of the storage medium, and if the high-frequency magnetic field is h, P can be defined by Eq. (3) below:

$$P = \frac{1}{2}\chi'' h^2 \omega \tag{3}$$

$\chi''(\omega)$ is strongly dependent on a frequency. If a frequency is far from a resonant frequency of a medium, $\chi''(\omega)$ is small and falls under the range around 1, and if a frequency is close to a resonant frequency, it increases and it falls under the range from 10 to 100. As heating efficiency of the storage medium is dependent on absorption power, the storage medium is heated strongly by a high-frequency magnetic field close to a resonant frequency. In other words, only the bits of the nth layer immediately below the recording magnetic pole are selectively heated, and the other bits are scarcely heated. If the temperature of medium rises, an anisotropy constant $K_{u1}$ decreases, similarly to laser assist, and magnetization is reversed selectively by the recording head magnetization to write data item.

The above-explained first and second principles are merely typical cases; in most cases, magnetization reversal occurs when both of the first and second principle are present, and as apparent from the above explanation, data item is written to a storage medium by reversing magnetization of desired bits of a three-dimensional storage medium, using the high-frequency assisted method.

FIG. 12 shows an example of a magnetic head for reading and writing. Since this ring-type magnetic pole can be used as a recording magnetic pole to write data item in each recording layer of a three-dimensional storage medium and as an auxiliary magnetic pole to read data item from each recording layer of a three-dimensional storage medium, it is possible to make a read/write magnetic head with a ring-type magnetic pole 801 and two micro magnetic oscillators 101, wherein one is used as an assist oscillator and the other as a reading oscillator.

According to the embodiment described in the above, by using a spin-torque oscillator and a recording magnetic pole, data item can be selectively written in each layer utilizing the magnetic resonance phenomenon and selectively read from each layer in a storage medium formed of multiple recording layers having different magnetic resonant frequencies. Thus, magnetic recording density can be significantly improved.

(Variation)

Not only a large saturation magnetization in a free layer, but also large amplitude of precession of magnetization, in other words, a large oscillation motion, is required of a spin-torque oscillator used as an assisting oscillator in order to generate a strong high-frequency magnetic field. Further, a wide frequency variability to be capable of reading data item from layers with different resonant frequencies and a large output voltage to achieve a good signal-to-noise ratio are required of a spin-torque oscillator.

A variation of a spin-torque oscillator will be explained in detail with reference to FIG. 13.

First, the reason why the element shown in FIG. 13 is suitable for a large oscillation motion of magnetization is explained. The spin-torque oscillator 1300 has a free layer 1301 formed of an in-plane magnetization film, and a fixed layer 1303 formed of a perpendicular magnetic film, and a non-magnetic layer 1302 between the free layer 1301 and the fixed layer 1303. In addition, an upper electrode 1304 is layered above the free layer 1301, and a lower electrode 1305 is layered below the fixed layer 1303, and thus, a spin-torque oscillator exists between the electrodes.

The magnetization of the free layer 1301 begins precession around the perpendicular axis of the perpendicular magnetic film of the fixed layer 1303 when a current density is larger than the critical current density Jc, as described above. In the element shown in FIG. 13, a large oscillation motion of magnetization occurs in a state in which a magnetic energy is small. This is because when the magnetization of the in-plane magnetization film of the free layer 1301 is any raised from the plane, a large oscillation motion around the perpendicular direction to the film can be acquired. Experiment revealed that the magnetization of the free layer in the element shown in FIG. 13 acts as one magnetic domain.

In the following, it will be explained that the element shown in FIG. 13 has broad frequency variability. Reading and writing of each recording layer of a three-dimensional storage medium requires high-frequency magnetic fields with different frequencies. Different high-frequency magnetic fields can be generated by using different elements having different frequencies of oscillation; however, it is more desirable to generate a wide range of high-frequency magnetic fields with one element.

The frequency of oscillation of the spin-torque oscillator 1300 having the structure shown in FIG. 13 is given by Eq. (4) below, and the frequency can be varied in a wide range.

$$f \cong \frac{\gamma}{2\pi}(4\pi M_z) \tag{4}$$

The γ represents a gyromagnetic ratio, and Mz represents a component z of the magnetization M, which is proportional to a direct current fed in the element.

As an example, the relationship between Mz/M (=sin θ) and a frequency of oscillation when Fe is used for the free layer is explained with reference to FIG. 14.

For example, sin θ is changed from 0.16 (θ=9.2°) to 0.5 (θ=30°) by increasing a current value, the oscillation frequency of a spin-torque oscillator is greatly changed from 10 GHz to 30 GHz. Thus, the oscillator shown in FIG. 13 can obtain a high-frequency magnetic field with a wide range of frequency by one oscillator, and is capable of writing data item to a three-dimensional storage medium. A non-magnetic metal or a tunnel insulating film can be used as a non-magnetic layer of the micro magnetic oscillator 1300; however, to prevent the element from heating, it is preferable to use a non-magnetic metal that generates less heat, such as Cu.

An example of a magnetic oscillator in a case of monitoring a high-frequency (voltage) output will be explained in detail with reference to FIGS. 15, 16 and 17.

As shown in FIG. 15, in the present variation, it is necessary to insert a non-magnetic layer 1502 above the in-plane magnetization film 1301 that is formed of the free layer, and to insert an in-plane magnetization film 1501 above the non-magnetic layer 1502, in order to monitor a voltage. An output voltage is generated between the free layer 1301 and the in-plane magnetization film 1501 by the MR effect. To prevent the element from heating, it is preferable to use a non-magnetic metal for the non-magnetic layer 1502, similarly to the non-magnetic layer 1302. However, as schematically shown in FIG. 16, the in-plane magnetization film 1501 decreases a frequency of oscillation due to dipole interaction with the free layer 1301. To avoid decreasing a frequency of oscillation, it is preferable to use an artificial antiferromagnetic material 1701 shown in FIG. 17 for the in-plane magnetization film 1501 to reduce the dipole interaction.

Finally, a structure for generating a large output voltage is explained. An output voltage is proportional to a product of the amplitude of precession of the free layer 1301 and the MR ratio. Generally, the MR ratio of a tunnel junction is relatively greater than the MR ratio of a junction via a non-magnetic metal. Thus, to generate a large output voltage, a tunnel insulating film can be used as the non-magnetic layer 1502 shown in FIG. 15.

According to the above-described embodiment, by using a spin-torque oscillator including a free layer formed of an in-plane magnetization film and a fixed layer formed of a perpendicular magnetization film, and a recording magnetic pole, selectively writing data item in each recording layer utilizing the magnetic resonance phenomenon, and selectively reading data item from each recording layer can be efficiently carried out by a spin-torque oscillator having a frequency variable over a wide range for a storage medium formed of multiple recording layers having different magnetic resonant frequencies.

EXAMPLES

Next, examples of the present embodiment will be explained.

First Example

An example of lamination of a micro magnetic oscillator and a coplanar-guide will be explained in detail with reference to FIG. 18.

A laminated structure 1800 shown in FIG. 18 is manufactured by applying an electron beam to, or by performing optical lithography on a magnetic laminated film generated on a glass substrate 1805 by sputtering. The central conductor of the coplanar-guide 1801 is a lamination of a CoFe1/Ru/CoFe2 layered film 1802 and Cu 1803, and the central conductor functions as an upper electrode of the spin-torque oscillator 101. The coercivity Hc of the CoFe1 film and CoFe2 film are 520 and 640 Oe, respectively. The resonant frequency of the CoFe1 layer and CoFe2 layer under the external magnetic field of 450 Oe are 8.1 and 9.7 GHz, respectively, when the magnetization of layers are parallel to the magnetic field, and 4.3 and 6.4 GHz when the magnetization of layers are antiparallel to the magnetic field. An FeCoB film is used for the free layer 104 of the spin-torque oscillator 101, an FeCoB/Ru/FeCo laminated layer for the fixed layer 102, and MgO is used for the tunnel insulating film 103. A lower electrode (Cu) 1804 of the spin-torque oscillator 101 is arranged below the fixed layer 102, and the ground plane (not shown) of the coplanar-guide 1801. In other words, the lower electrode 1804 is connected to ground (GND). An exchange bias is applied to each of the free layer 104 and the fixed layer 102 by IrMn. The exchange bias applied to the free layer 104 is adjusted in a manner such that the frequency of oscillation of the spin-torque oscillator 101 under an external magnetic field of 450 Oe is 8.1 GHz.

(Reading of Magnetization Direction)

The magnetic field dependency of output voltage of the spin-torque oscillator 101 will be explained in detail with reference to FIG. 19. The magnetic field dependency is measured by feeding a current of 2 mA to the spin-torque oscillator 101 and reducing a magnetic field successively. The black dots in FIG. 19 indicate the magnetic field dependency of output voltage when a magnetic field of 600 Oe is applied in the same direction as the free layer magnetization direction to make the magnetization direction of the CoFe1 layer parallel to the magnetization direction of the free layer 104. The white dots of FIG. 19 indicate the magnetic field dependency of output voltage when a magnetic field of 600 Oe is applied in the direction opposite to the free layer magnetization direction to make the magnetization direction of the CoFe1 layer antiparallel to the magnetization direction of the free layer 104.

Figure 19:
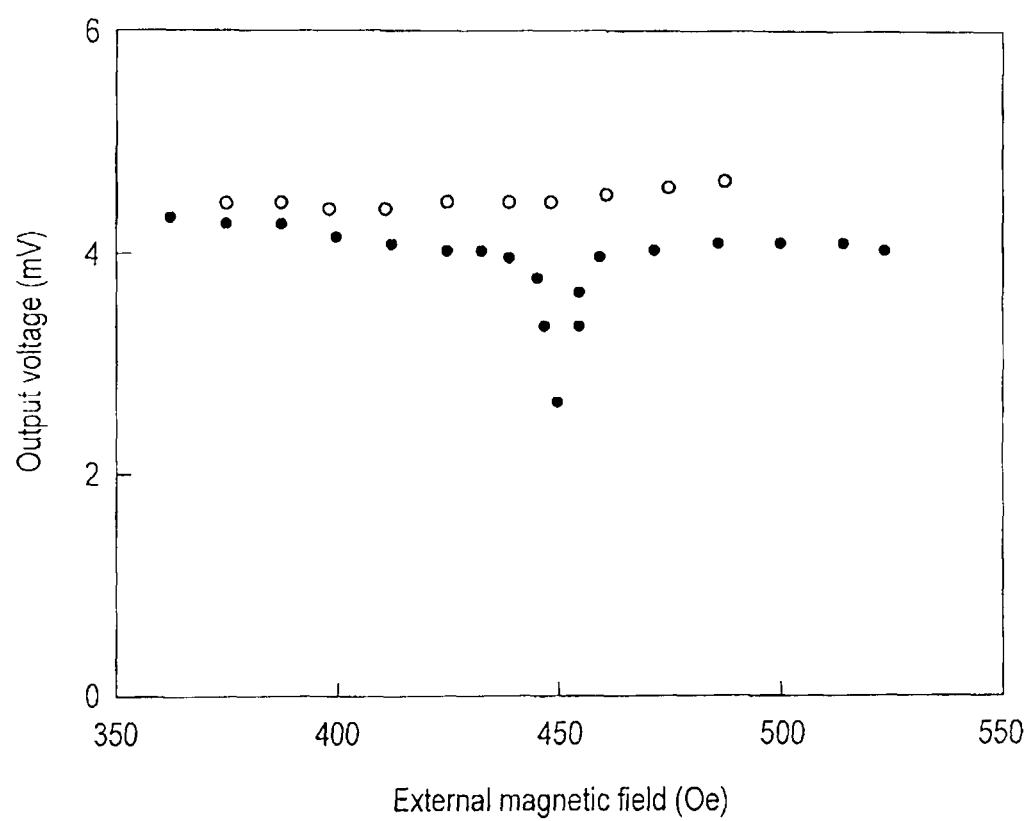
FIG. 19 is a diagram illustrating a result of the experiment on magnetic field dependence of an output voltage of the spin-torque oscillator in the first example.

In FIG. 19, when the magnetization of the CoFe1 layer is parallel to an external magnetic field of approximately 450 Oe, the output voltage of the spin-torque oscillator indicated by the black dots rapidly drops; thus, it can be understood that magnetic resonance occurs in the CoFe1 layer. On the other hand, when the magnetization of CoFe1 layer is antiparallel, magnetic resonance does not occur, and the output voltage does not drop as indicated by the white dots. Accordingly, the magnetization direction of the CoFe1 layer can be read by observing magnetic resonance.

(Writing by Magnetization Reversal)

A structure similar to the above-described structure is manufactured, but the frequency of oscillation of the spin-torque oscillator 101 is 4.3 GHz in the present structure. First, an external magnetic field of 450 Oe is applied in antiparallel to the magnetization of the CoFe1 layer. Next, a current of 2 mA is fed to the spin-torque oscillator 101, and the magnetic field dependency of output voltage of the spin-torque oscillator 101 is measured. As a result, similarly to the black dots in FIG. 19, the output voltage drops at 450 Oe because of magnetic resonance. FIG. 20 shows current dependency of output voltage when a current is increased but an external magnetic field is maintained at 450 Oe. At 2.5 mA, the output voltage rapidly rises. The result indicates that the magnetization of the CoFe1 layer is reversed by a high-frequency magnetic field.

Second Example

A case in which the artificial antiferromagnetic material 1701 is used for the in-plane magnetization film 1501 in the micro magnetic oscillator shown in FIG. 15 will be explained in detail with reference to FIG. 21. FIG. 21 is a sectional view of the lamination structure 2100 comprising the spin-torque oscillator 1500 that can be manufactured by the same method as FIG. 18 and the coplanar-guide 1801. The magnetization of the CoFe1 film and the CoFe2 film is fixed in a direction indicated by the arrows in the FIG. 21 by an exchange bias of an IrMn film (not shown).

An Fe film is used for the free layer 1301 of the micro magnetic oscillator 1500, an FePt perpendicular magnetic film for the fixed layer 1303, a CoFe/Ru/CoFeB artificial ferromagnetic film is used for the in-plane magnetization film 1501, and easy axes of magnetization of the free layer 1301 and the in-plane magnetization film 1501 are set parallel to the coplanar-guide 1801. An MgO tunnel insulating film is used for the non-magnetic layer 1302, a Cu film is used for the non-magnetic layer 1502 and 1503. The lower electrode (Cu) 1804 of the spin-torque oscillator 1500 is arranged below the fixed layer 1303, and connected to the ground plane (not shown) of the coplanar guide 1801. Because the frequency of oscillation of the spin-torque oscillator 1500 can be varied by a direct current fed to the spin-torque oscillator 1500, it is set at 10.00 GHz by feeding a current of 2.3 mA.

(Reading of Magnetization Direction)

Figure 22:
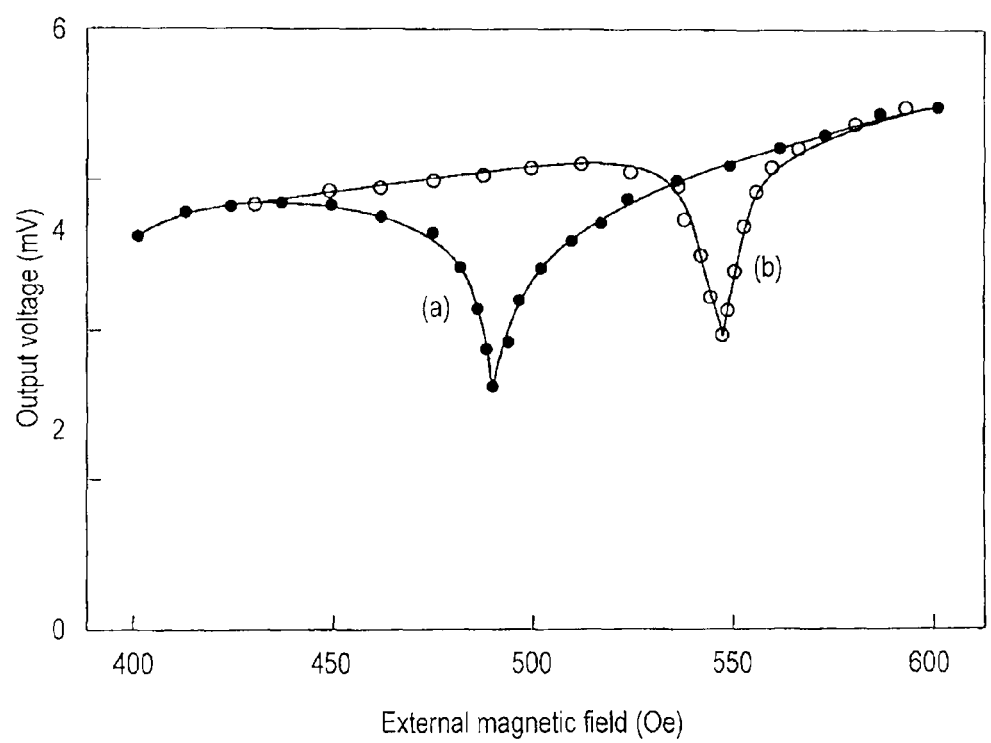
FIG. 22 is a diagram illustrating a result of experiment on magnetic field dependence of an output voltage of the spin-torque oscillator in the second example.

The result of measurement on magnetic field dependency of output voltage of the spin-torque oscillator 1500 is shown in FIG. 22.

Figure 23:
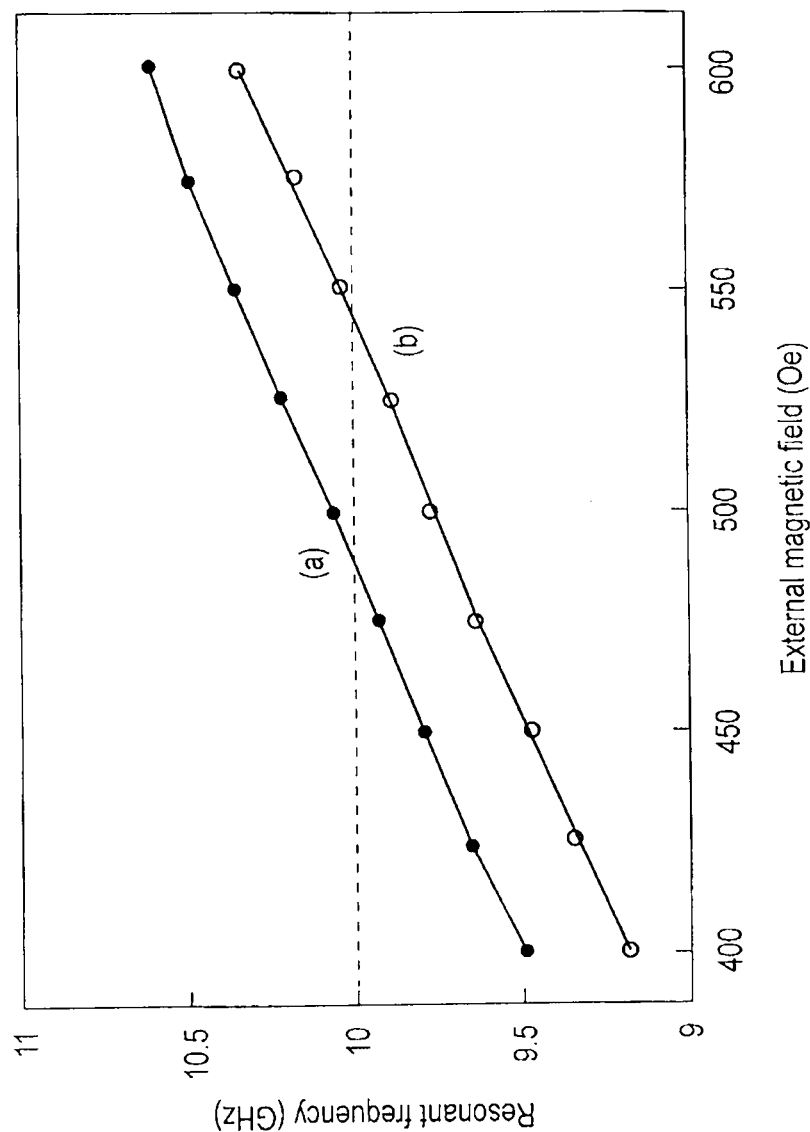
FIG. 23 is a diagram illustrating the relationship between a resonant frequency and external magnetic field.

The curve (a) indicates a case in which an external magnetic field is applied in parallel to the magnetization of the CoFe1 film, and the curve (b) indicates a case in which an external magnetic field is applied in parallel to the magnetization of the CoFe2 film. When the external magnetic field is parallel to the magnetization of the CoFe1 film, the output voltage drops at 490 Oe as indicated by the curve (a) of FIG. 22, and when the external magnetic field is antiparallel to the magnetization of the CoFe1 film (i.e., parallel to the magnetization of the CoFe2 film), the output voltage drops at 550 Oe as indicated by the curve (b) of FIG. 22. The relationship between the resonant frequency and the external magnetic field is shown in FIG. 23. Therefore, it is obvious that the output voltage drops because of the magnetic resonance absorption of the CoFe1 film and the CoFe2 film. When the magnetization of the CoFe1 film and the CoFe2 film is opposite to the external magnetic field, the output voltage does not drop, in other words, magnetic resonance absorption does not occur.

(Writing by Magnetization Reversal)

A structure similar to that shown in FIG. 21 is manufactured by the above-described method, but no exchange bias is applied to the magnetization of the CoFe1 film and the CoFe2 film in the present structure. The coercivity of the CoFe1 film and the CoFe2 film in this structure is 320 Oe and 350 Oe, respectively. After applying an external magnetic field of 500 Oe at first, the external magnetic field is reduced to 100 Oe to observe the magnetic resonance of the CoFe1 film and the CoFe2 film by the above-described method; as a result, resonance absorption occurs at 6.4 GHz and 6.8 GHz, respectively. Subsequently, while an external magnetic field of −100 Oe by reversing the magnetic field is applied, a high-frequency magnetic field is applied by the spin-torque oscillator 1500, the magnetization reversal can be observed at 4.6 GHz for the CoFe1 film and 5.0 GHz for the CoFe2 film; thus, the assist effect by a high-frequency magnetic field is confirmed.

As conventional examples, an example of assist oscillator used for conventional magnetic recording is shown in FIGS. 24(a) and 24(b). The example shown in FIG. 24(a) is an element that uses perpendicular magnetic films for the free layer 1301 and the fixed layer 1303. The example shown in FIG. 24(b) is an element that uses in-plane magnetization films for the free layer 1301 and the fixed layer 1303. According to a simulation assuming a single magnetic domain, the magnetization direction of the free layer 1301 of each example is greatly different from that in a thermal equilibrium state. In other words, a great amount of magnetic energy is required to heighten an angle θ to cause a large oscillation motion of magnetization in an element such as one shown in FIG. 24. In an experiment, a large oscillation motion of magnetization is not observed in an element such as one shown in FIG. 24. It can be considered that when a magnetic energy is large, i.e., when an angle θ is high, the free layer 104 is not single magnetic domain, and more complex and unstable motion would be observed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A three-dimensional magnetic recording and reproducing apparatus, comprising:
    a recording head comprising a first spin-torque oscillator comprising a first free layer, a first non-magnetic layer and a first fixed layer, magnetization of the first free layer being rotatable, the first non-magnetic layer being laminated on the first free layer, the first fixed layer being laminated on the first non-magnetic layer, a magnetization direction of the first fixed layer being fixed;
    a reading head comprising a second spin-torque oscillator comprising a second free layer, a second non-magnetic layer and a second fixed layer, magnetization of the second free layer being rotatable, the second non-magnetic layer being laminated on the second free layer, the second fixed layer being laminated on the second non-magnetic layer, a magnetization direction of the second fixed layer being fixed; and
    a magnetic storage medium comprising a plurality of first magnetic layers formed of magnetic materials having different resonant frequencies, each of the first magnetic layers being formed of an in-plane magnetization film and having recording tracks, a magnetization direction in the in-plane magnetization film being oriented parallel to the film plane and vertical to the recording tracks in order to reduce dipole interaction between bits of adjacent layers and between adjacent bits in the same layer.

2. The apparatus according to claim 1, wherein each recording track comprises a plurality of first regions, each first region has a magnetization direction, and at least one of the first regions has such magnetization direction that is parallel to a track surface of the recording tracks and is perpendicular to a track direction.

3. The apparatus according to claim 2, wherein the magnetic storage medium further comprises a non-magnetic material and second regions in addition to the first regions, the non-magnetic material being between the first regions, the second regions being formed of a soft magnetic material and connected to each of the first regions via the non-magnetic material.

4. The apparatus according to claim 1, wherein the first magnetic layers of the magnetic storage medium are in an ascending order of a resonant frequency, from a first magnetic layer closest to the reading head to a first magnetic layer farthest from the reading head.

5. The apparatus according to claim 4, wherein if a data item is read from the recording tracks by the reading head, a frequency of oscillation of the second spin-torque oscillator is the same as a resonant frequency of a layer of the first magnetic layers in which the data item is written, if the data item is written to the recording tracks by the recording head, the frequency of oscillation of the first spin-torque oscillator is the same as a resonant frequency of a layer of the first magnetic layers in which the data item to be written.

6. The apparatus according to claim 5, wherein if the data item is read from or written to the recording tracks by the respective reading or recording head, the magnetic recording or reading head further comprises a magnetic pole to adjust a resonant frequency of the first region, a distance between the magnetic pole and the respective first or second spin-torque oscillator is set in a manner such that, if the data item is read, a high-frequency magnetic field created by the first or second spin-torque oscillator reaches to the first region, and if the data item is written, the high-frequency magnetic field reaches to the first region.

7. The apparatus according to claim 6, wherein if the data item is read from the recording track by the reading head, at least either one of a power change of the electromagnetic wave or a phase change of the electromagnetic wave emitted from the second spin-torque oscillator is detected.

8. The apparatus according to claim 6, wherein the magnetic pole is ring-type magnetic pole.

9. The apparatus according to claim 1, wherein the free layer is formed of with an in-plane magnetization film, and the fixed layer is formed of a perpendicular magnetization film.

10. The apparatus according to claim 9, wherein if the data item is read from or written to the recording tracks by the respective reading or recording head, the first or second spin-torque oscillator is arranged as follows; a second non-magnetic layer is formed on the free layer on the opposite side of the first nonmagnetic layer, and a second magnetic layer of an in-plane magnetization film is formed on the second non-magnetic layer on the opposite side of the free layer.

11. The apparatus according to claim 10, wherein the second magnetic layer is formed of an artificial antiferromagnetic material.

12. The apparatus according to claim 10, wherein the second non-magnetic layer is formed of a tunnel insulating film.

* * * * *